(12) United States Patent
Blockley et al.

(10) Patent No.: US 9,075,219 B2
(45) Date of Patent: Jul. 7, 2015

(54) CONNECTOR DEVICE AND METHOD FOR PRODUCING A FURCATED FIBRE OPTIC CABLE

(75) Inventors: Nicholas Blockley, Milton Keynes (GB); Asher Raven, Milton Keynes (GB); Alan Keizer, Milton Keynes (GB)

(73) Assignee: FibreFab Limited, Milton Keynes (GB)

( * ) Notice: Subject to any disclaimer, the term of this patent is extended or adjusted under 35 U.S.C. 154(b) by 604 days.

(21) Appl. No.: 13/386,270

(22) PCT Filed: Jul. 13, 2010

(86) PCT No.: PCT/GB2010/051143
§ 371 (c)(1),
(2), (4) Date: May 10, 2012

(87) PCT Pub. No.: WO2011/010126
PCT Pub. Date: Jan. 27, 2011

(65) Prior Publication Data
US 2012/0230636 A1   Sep. 13, 2012

(30) Foreign Application Priority Data

Jul. 20, 2009 (GB) .................................. 0912590.7

(51) Int. Cl.
*G02B 6/44* (2006.01)
(52) U.S. Cl.
CPC ......... *G02B 6/4471* (2013.01); *Y10T 29/49826* (2015.01); *G02B 6/4477* (2013.01); *G02B 6/4472* (2013.01)
(58) Field of Classification Search
None
See application file for complete search history.

(56) References Cited

U.S. PATENT DOCUMENTS

| 4,744,622 | A | 5/1988 | Cherry et al. |
| 4,799,760 | A * | 1/1989 | Beatty et al. .................... 385/87 |

(Continued)

FOREIGN PATENT DOCUMENTS

| DE | 42 14 039 | 11/1993 |
| FR | 2670303 | 6/1990 |

(Continued)

OTHER PUBLICATIONS

British Search Report dated Sep. 22, 2009 for Application No. GB0912590.7.

(Continued)

*Primary Examiner* — Mike Stahl
(74) *Attorney, Agent, or Firm* — Fay & Sharpe LLP

(57) ABSTRACT

A connector device (203) for connecting a first fiber optic cable (1;101) to a plurality of second fiber optic cables (9'; 220). The connector device (203) includes a casing (205) having a first opening (204) arranged to receive the first fiber optic cable (1;101), a second opening (206) arranged to receive the plurality of second fiber optic cables (9';222), a cavity that connects the first and second openings (204, 206) such that a fiber connection can be made between the first fiber optic cable (1;101) and the plurality of second cables (9';220), and first and second parts (205a, 250b) that are connectable to each other; and securing means for securing the casing (205) to the first fiber optic cable (1;101) and to the plurality of second fiber optic cables (9';220) such that when secured thereto the casing (205) transfers tensile loads between the cables (1;101, 9';220), wherein the securing means includes a furcation member (209) that is arranged to receive and support the plurality of second fiber optic cables (9';220). A method for producing a furcated fiber optic cable is also disclosed.

34 Claims, 23 Drawing Sheets

(56) References Cited

U.S. PATENT DOCUMENTS

| | | | |
|---|---|---|---|
| 4,826,277 A * | 5/1989 | Weber et al. | 385/100 |
| 4,989,945 A * | 2/1991 | Ohkura | 385/39 |
| 5,071,220 A * | 12/1991 | Ruello et al. | 385/135 |
| 5,185,840 A * | 2/1993 | Iapicco | 385/100 |
| 5,313,539 A * | 5/1994 | Ogawa et al. | 385/76 |
| 6,278,831 B1 * | 8/2001 | Henderson et al. | 385/139 |
| 6,389,214 B1 | 5/2002 | Smith et al. | |
| 6,738,555 B1 * | 5/2004 | Cooke et al. | 385/136 |
| 7,270,485 B1 | 9/2007 | Robinson et al. | |
| 8,571,367 B2 * | 10/2013 | Van Der Meulen et al. | 385/100 |
| 8,573,855 B2 * | 11/2013 | Nhep | 385/77 |
| 2002/0141724 A1 * | 10/2002 | Ogawa et al. | 385/137 |
| 2006/0193573 A1 * | 8/2006 | Greenwood et al. | 385/103 |
| 2013/0129296 A1 * | 5/2013 | Murano et al. | 385/135 |

FOREIGN PATENT DOCUMENTS

| | | |
|---|---|---|
| FR | 2662270 | 11/1991 |
| FR | 2676287 | 11/1992 |
| WO | WO 00/08498 | 2/2000 |

OTHER PUBLICATIONS

International Search Report mailed Oct. 4, 2010 for International application No. PCT/GB2010/051143.

Written Opinion of the International Searching Authority Report mailed Oct. 4, 2010 for International application No. PCT/GB2010/051143.

* cited by examiner

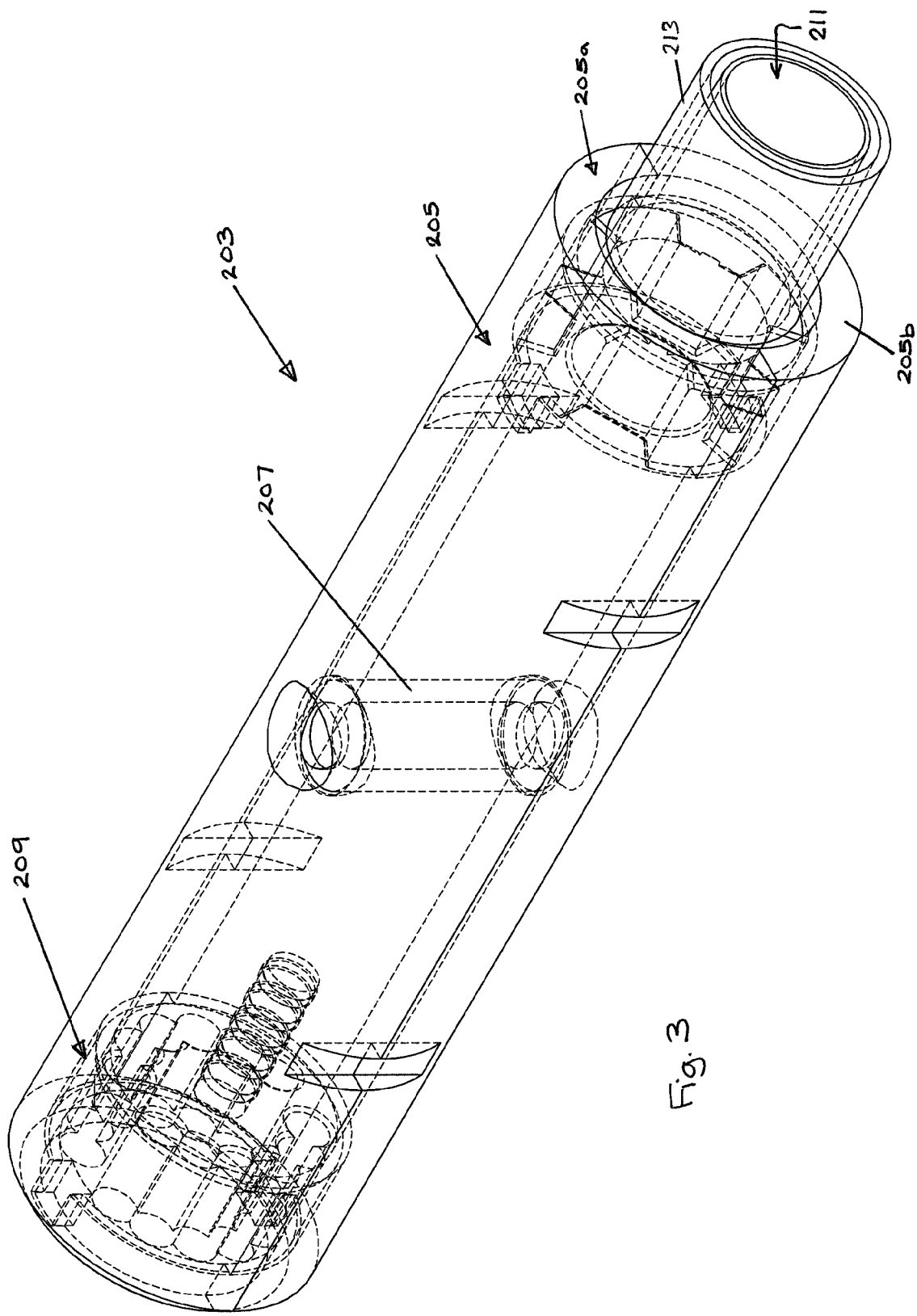

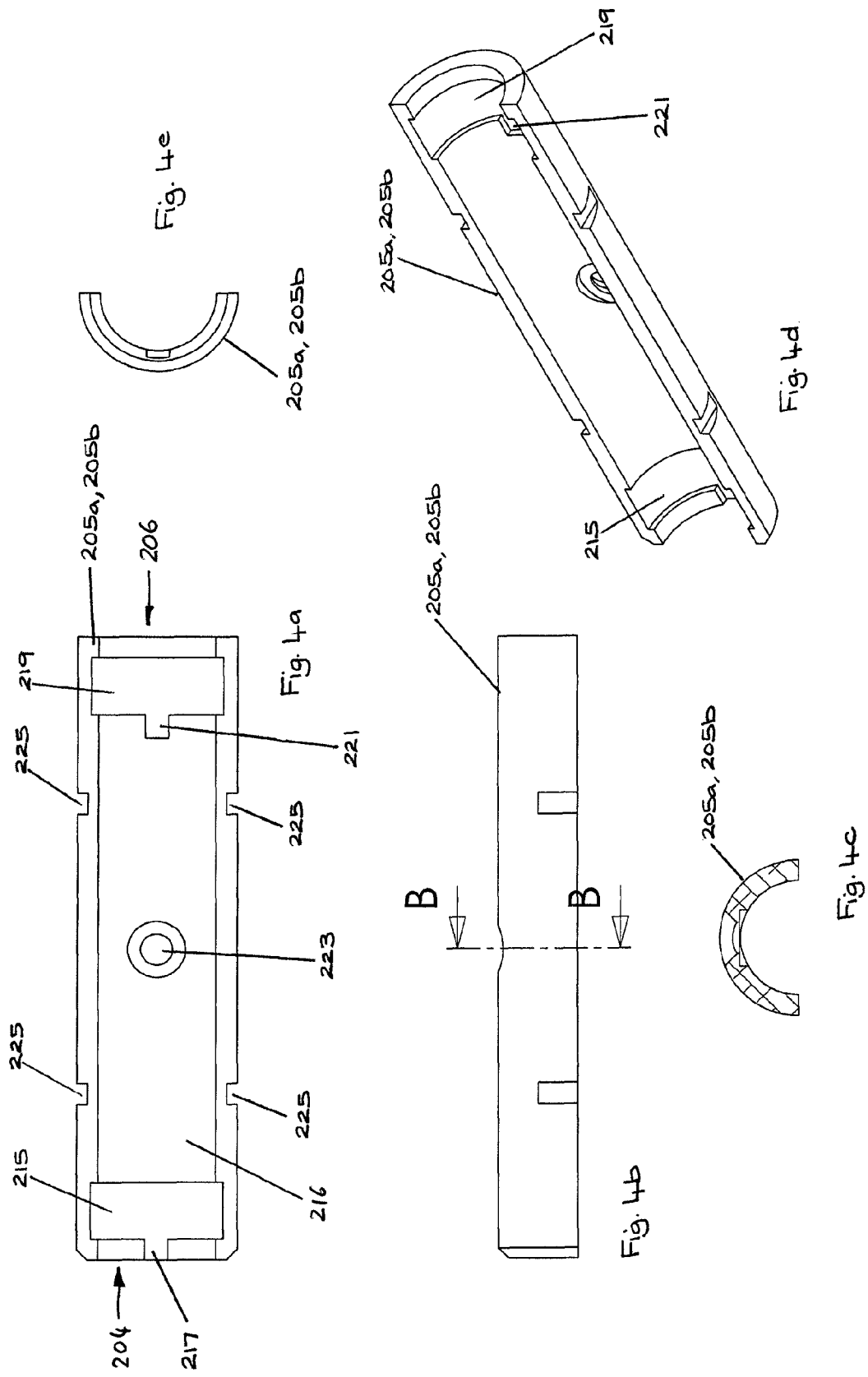

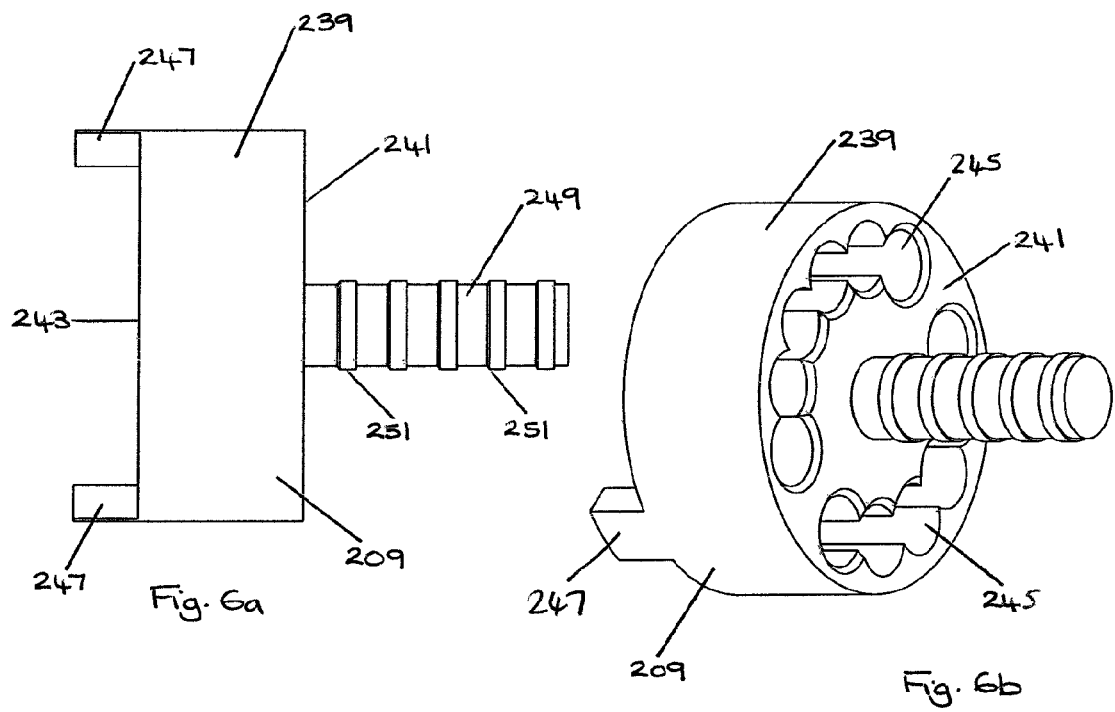
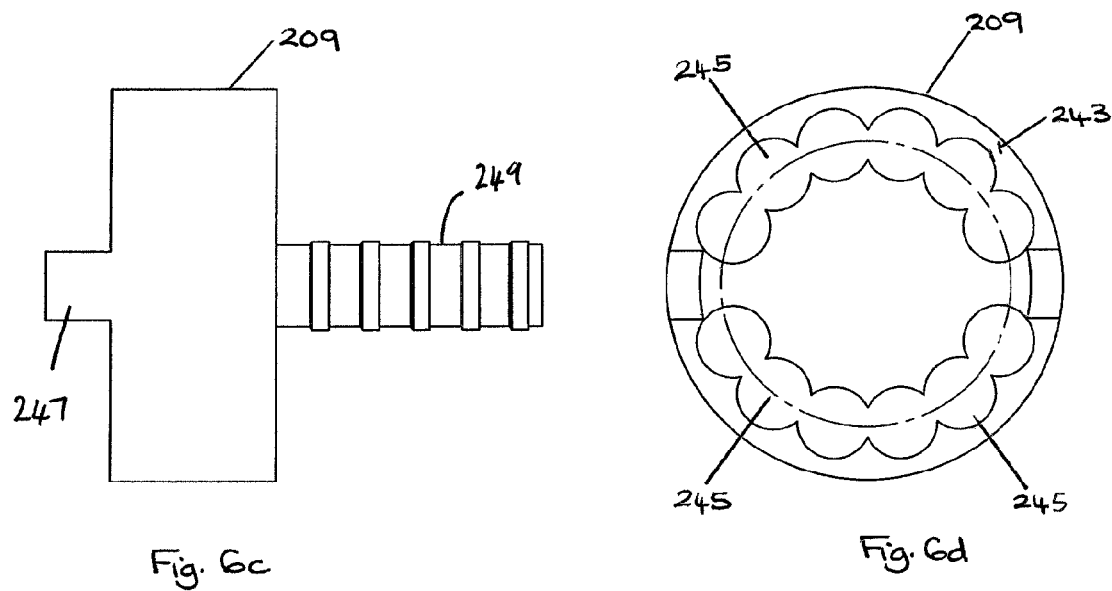

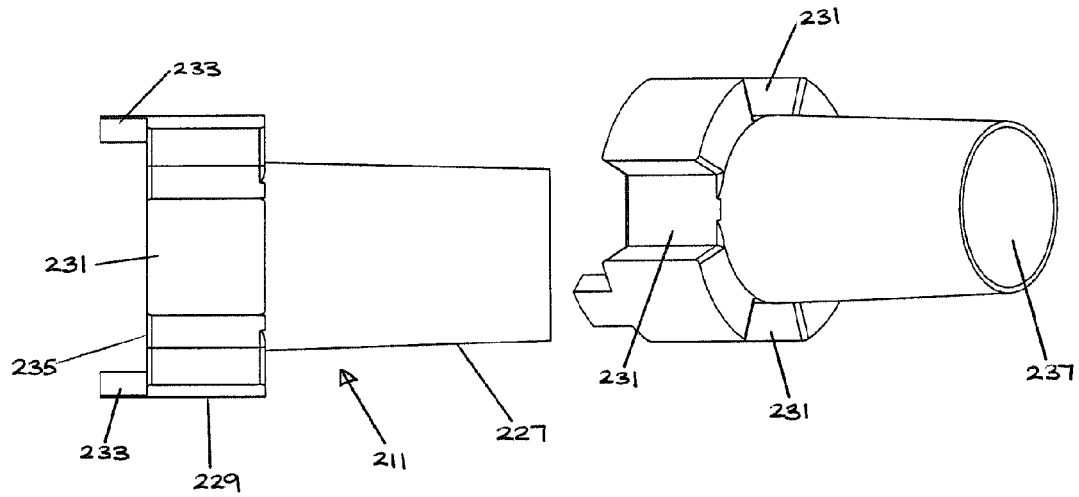
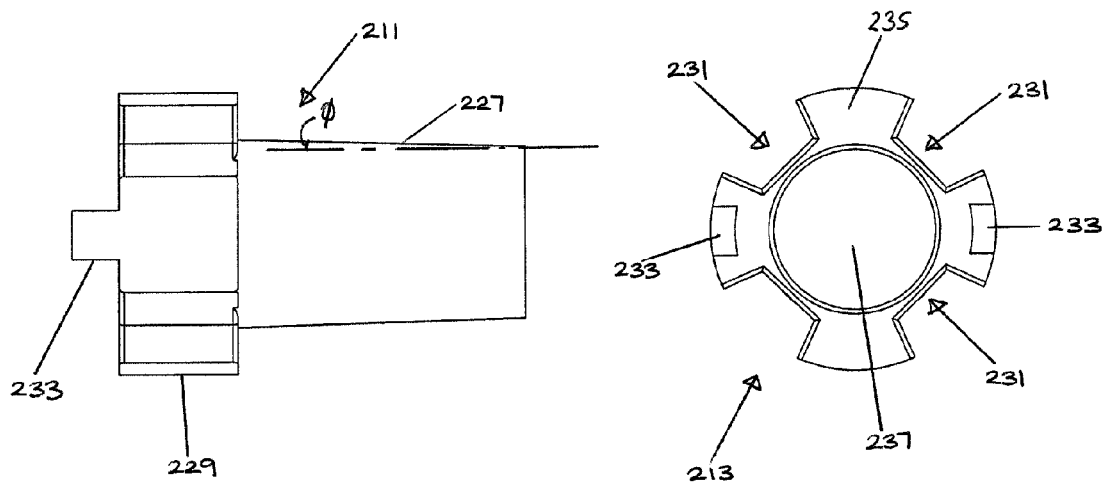

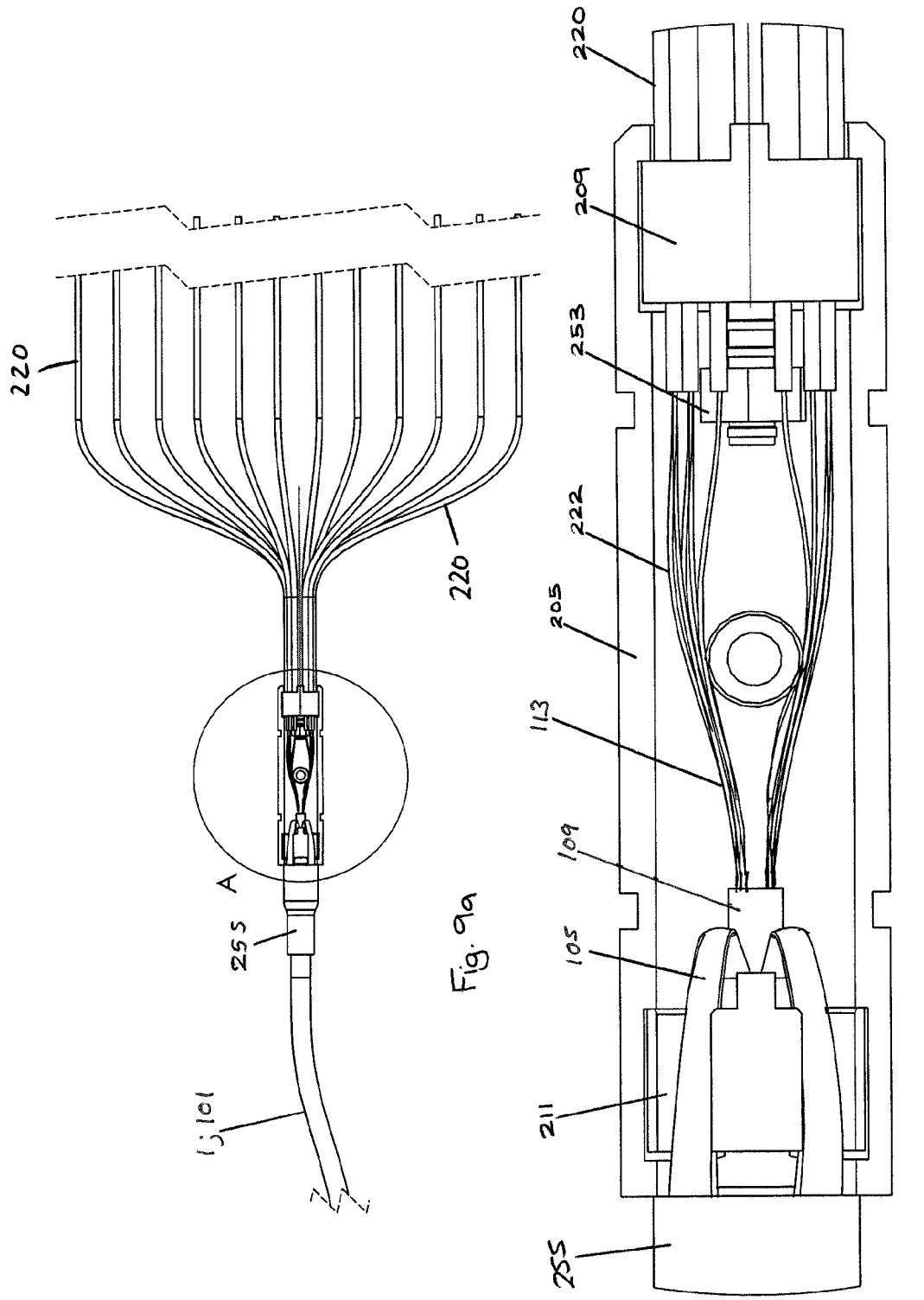

209b

209c

209d

209e

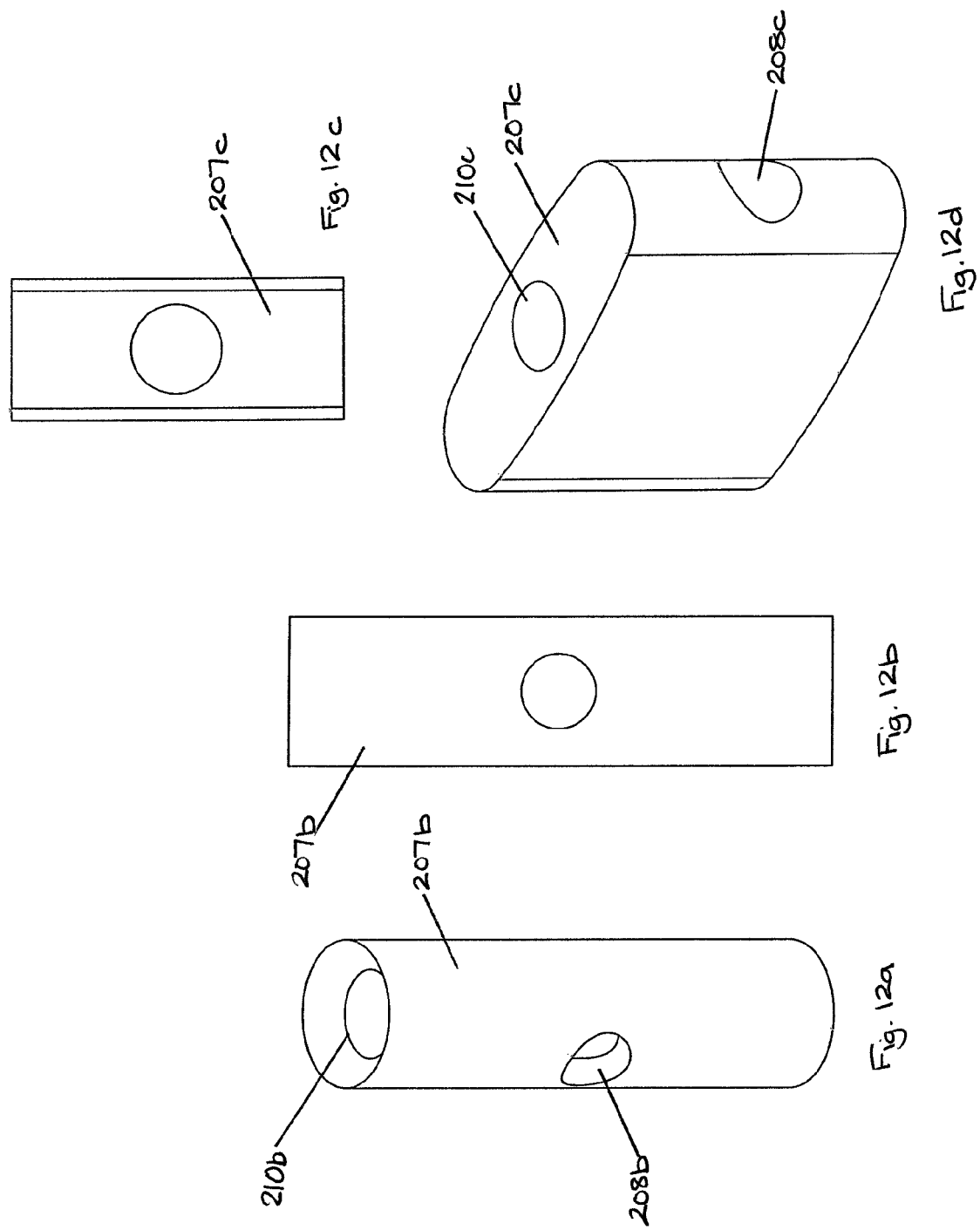

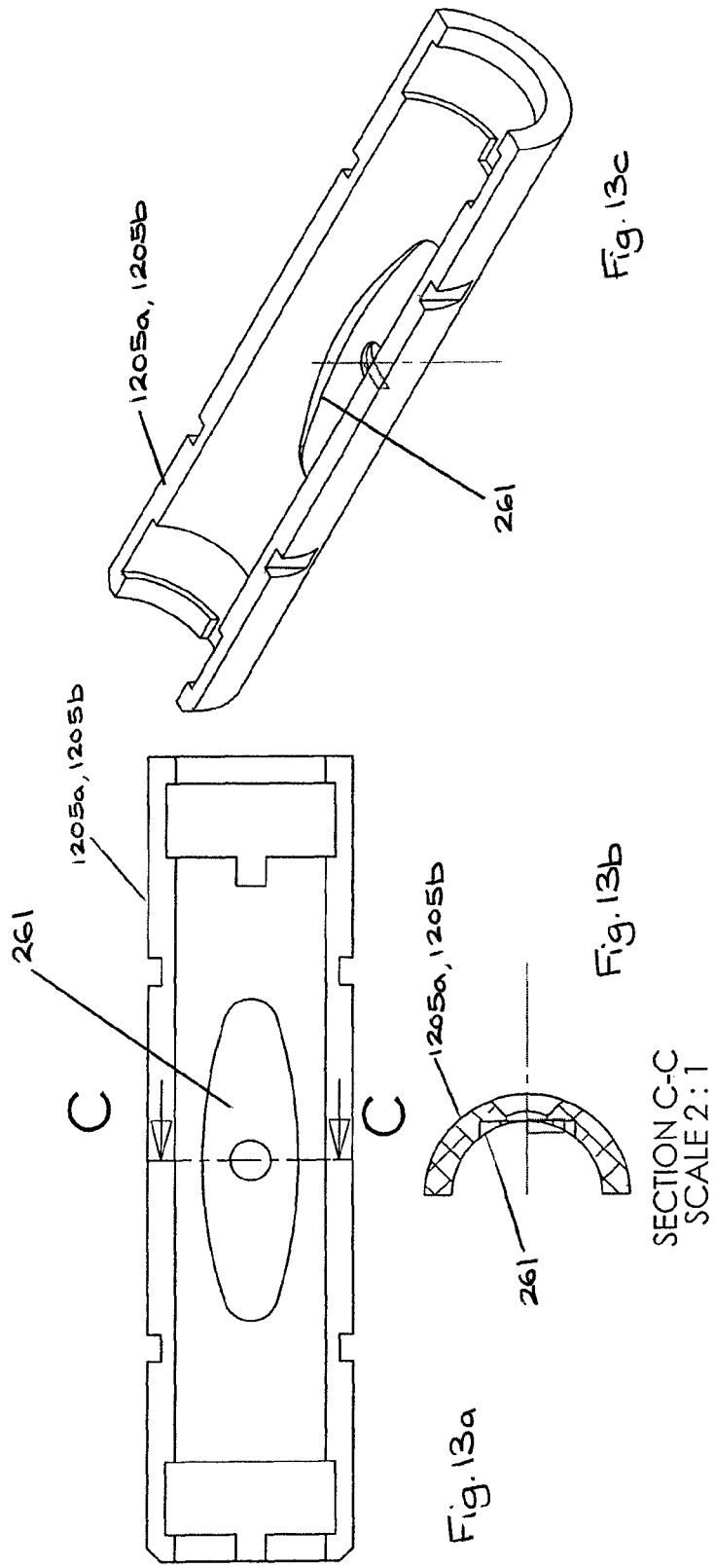

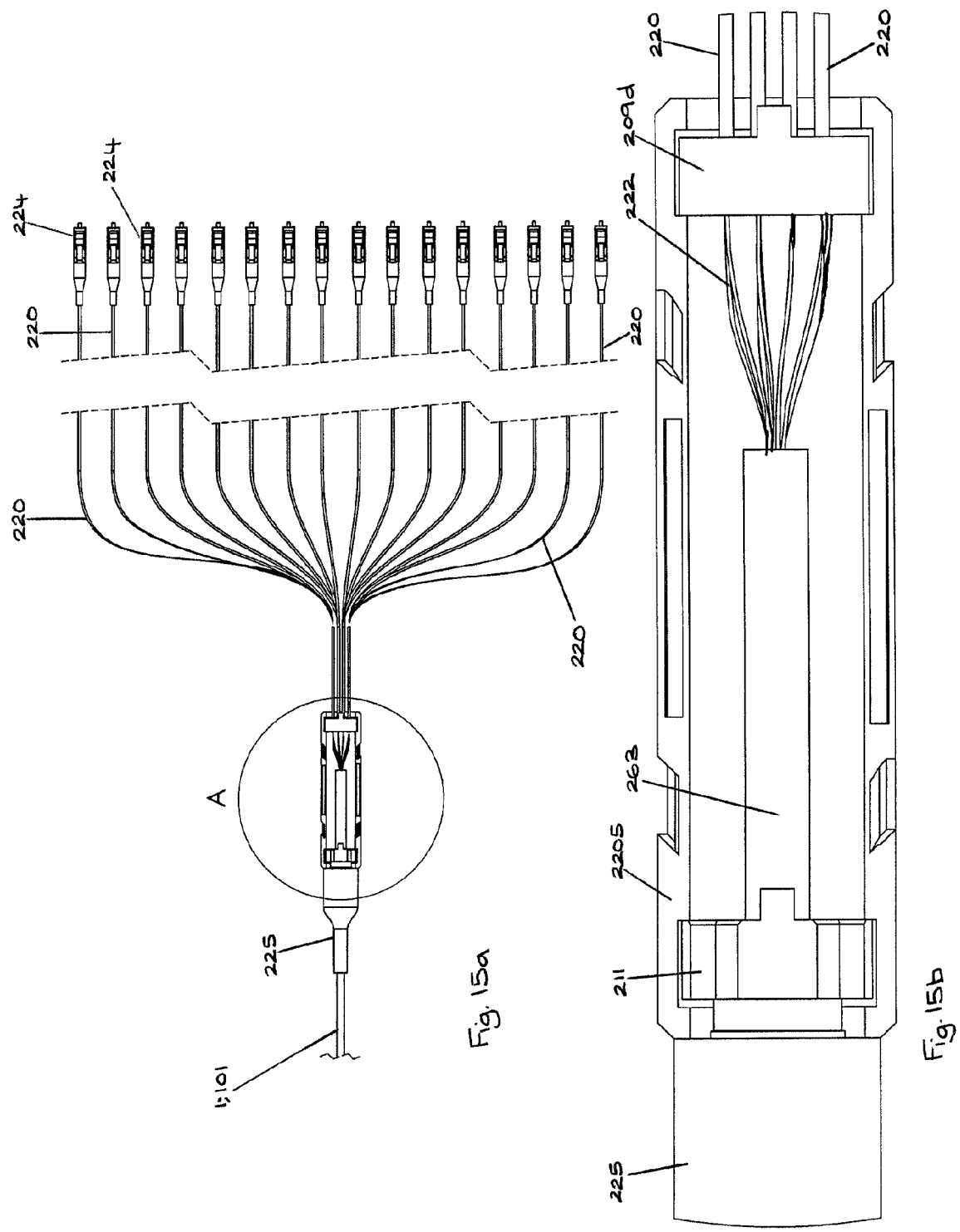

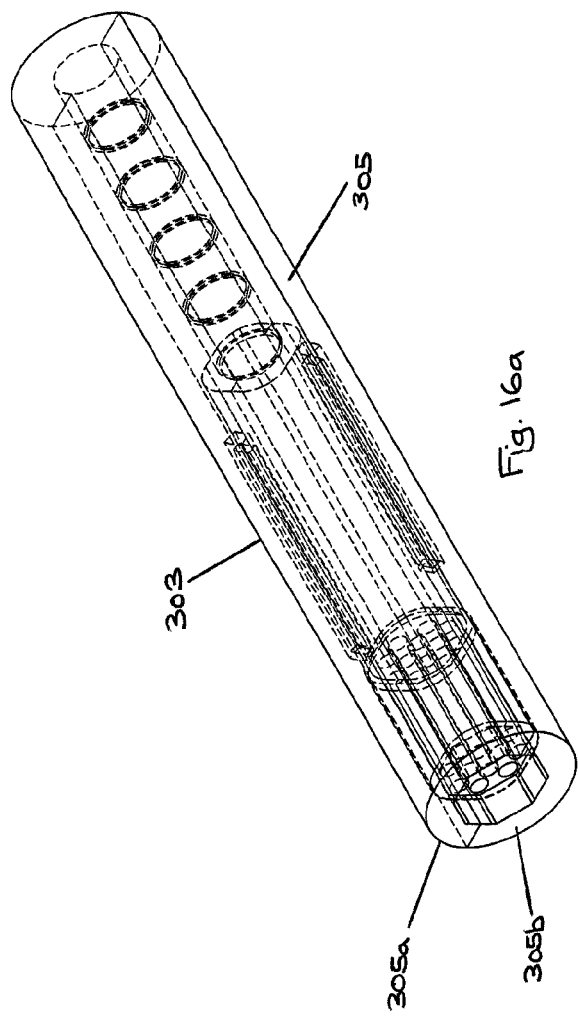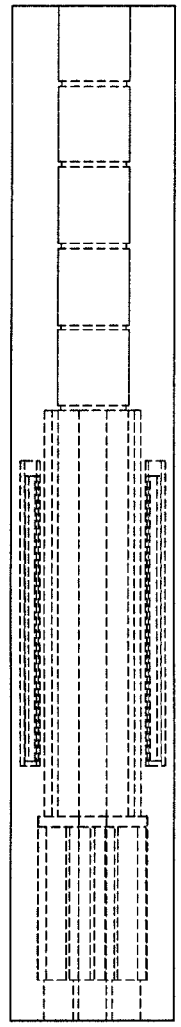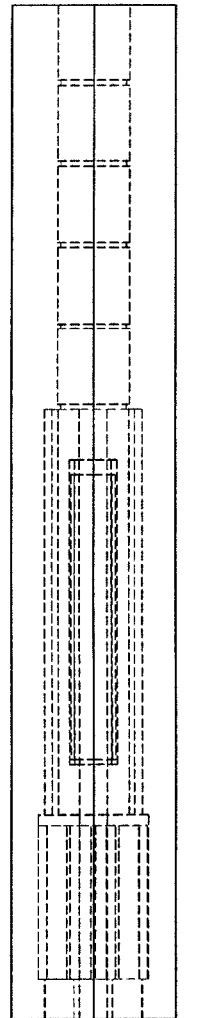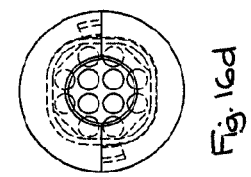

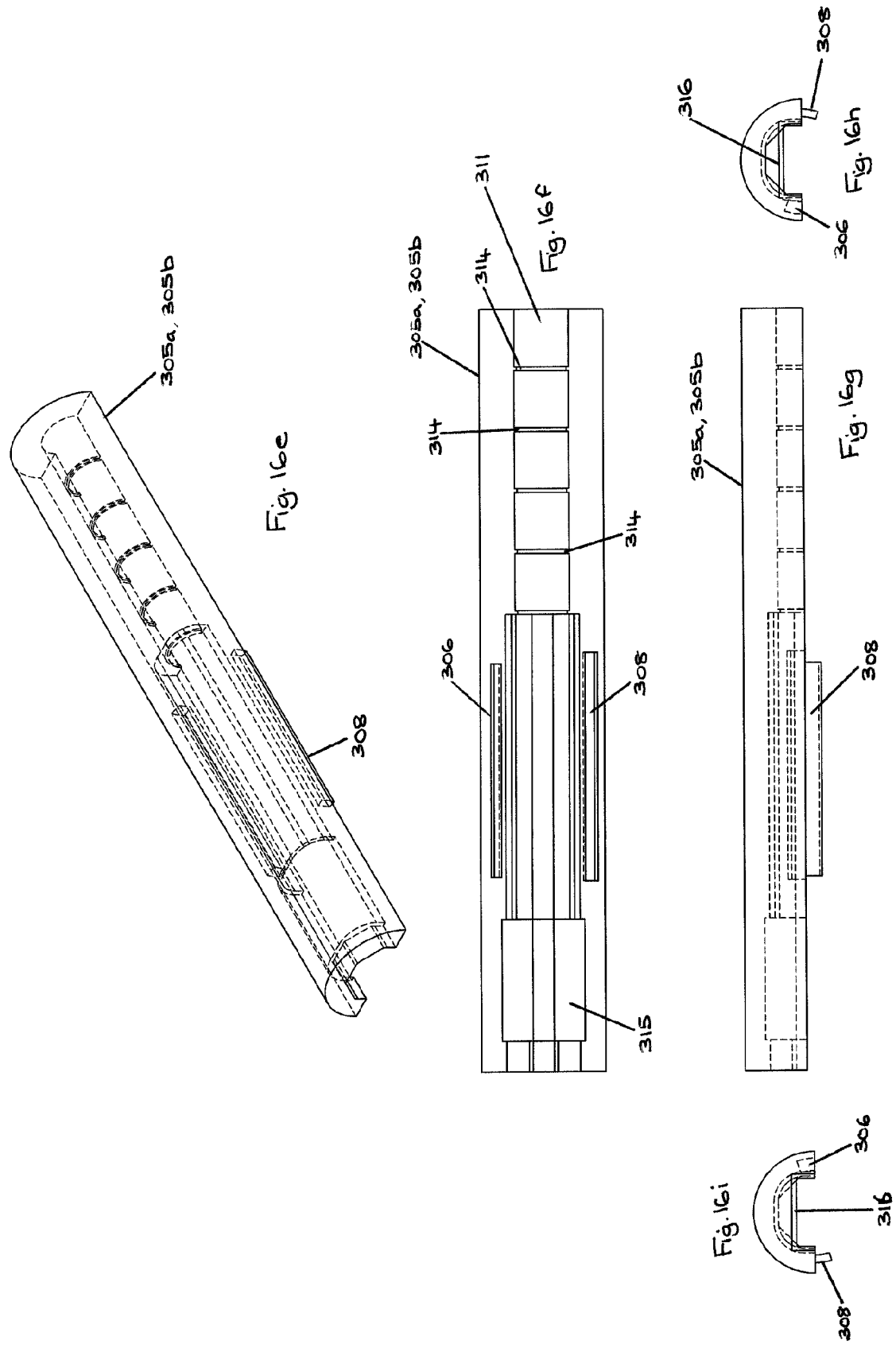

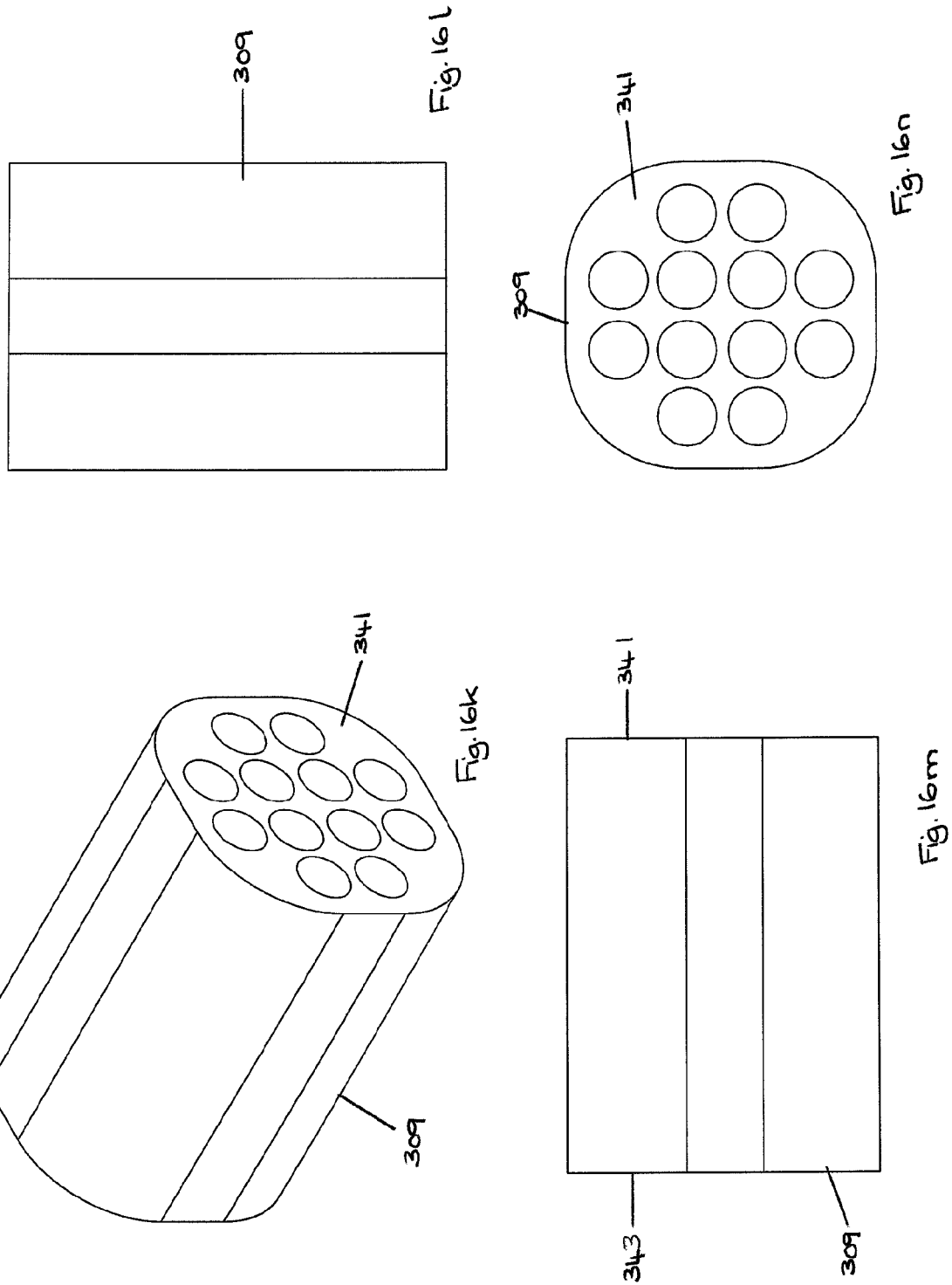

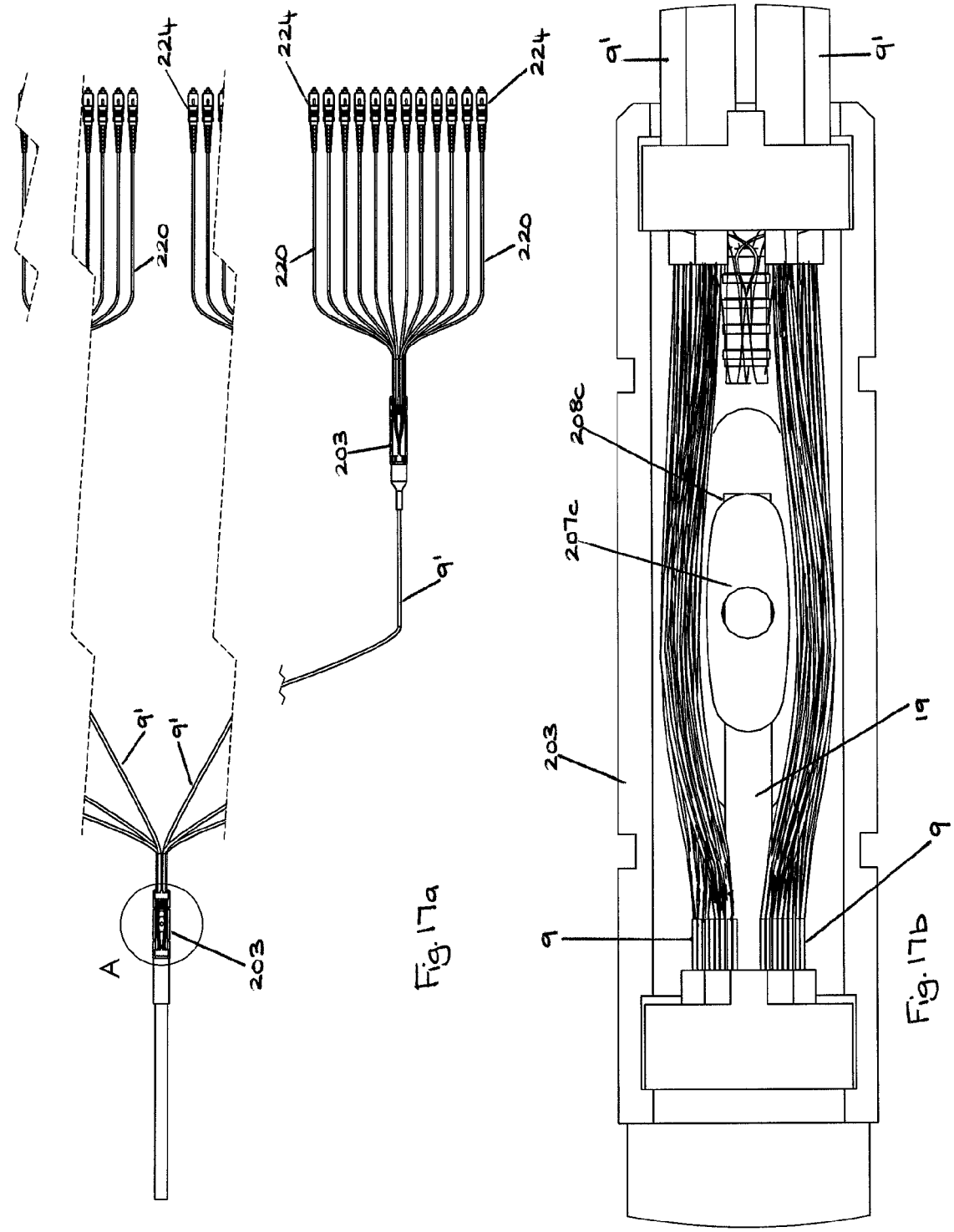

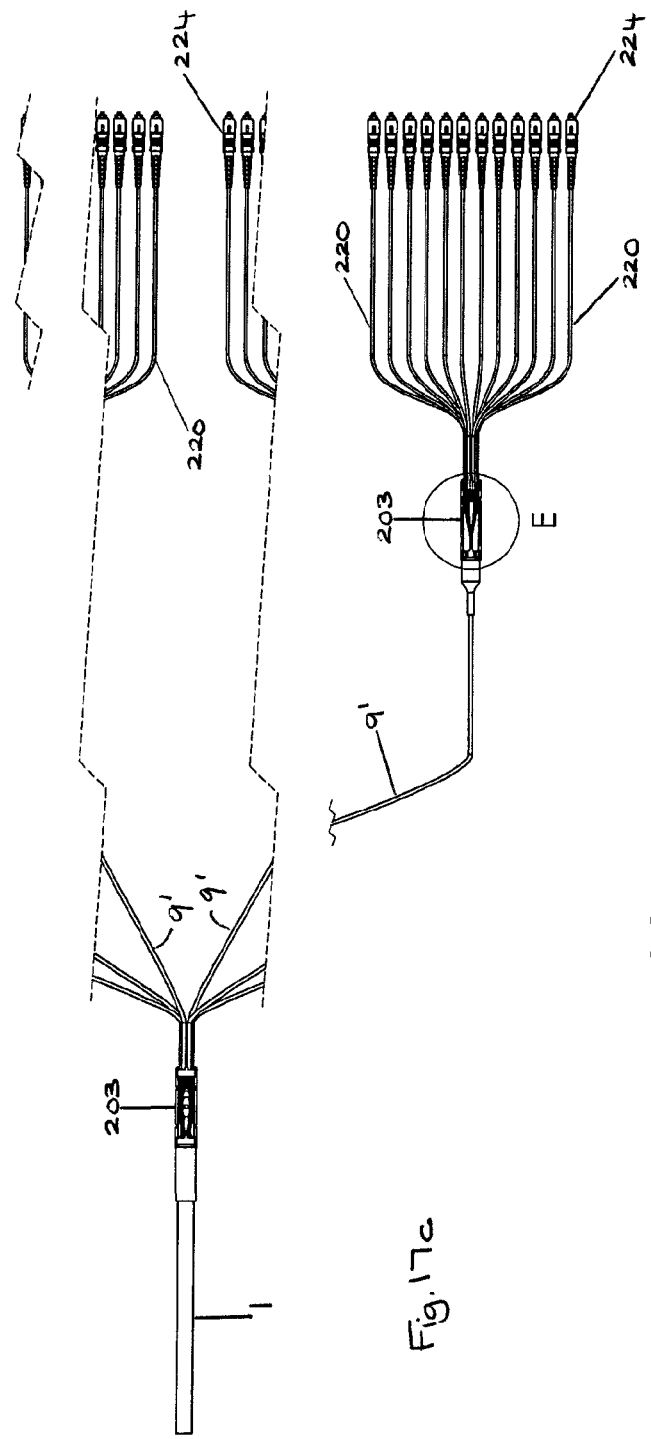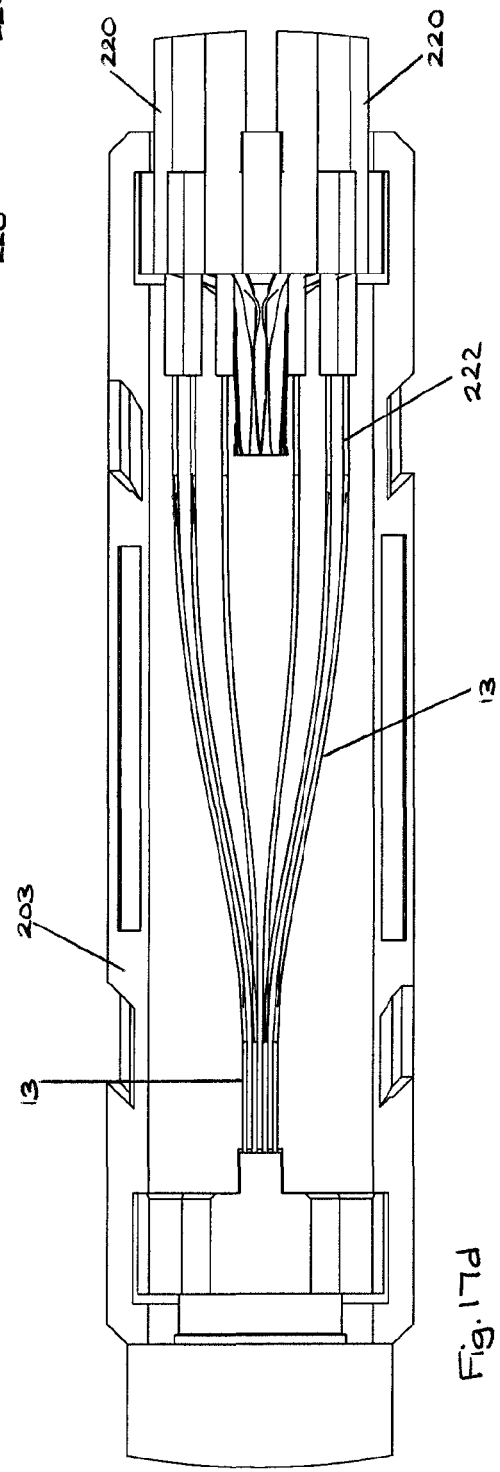

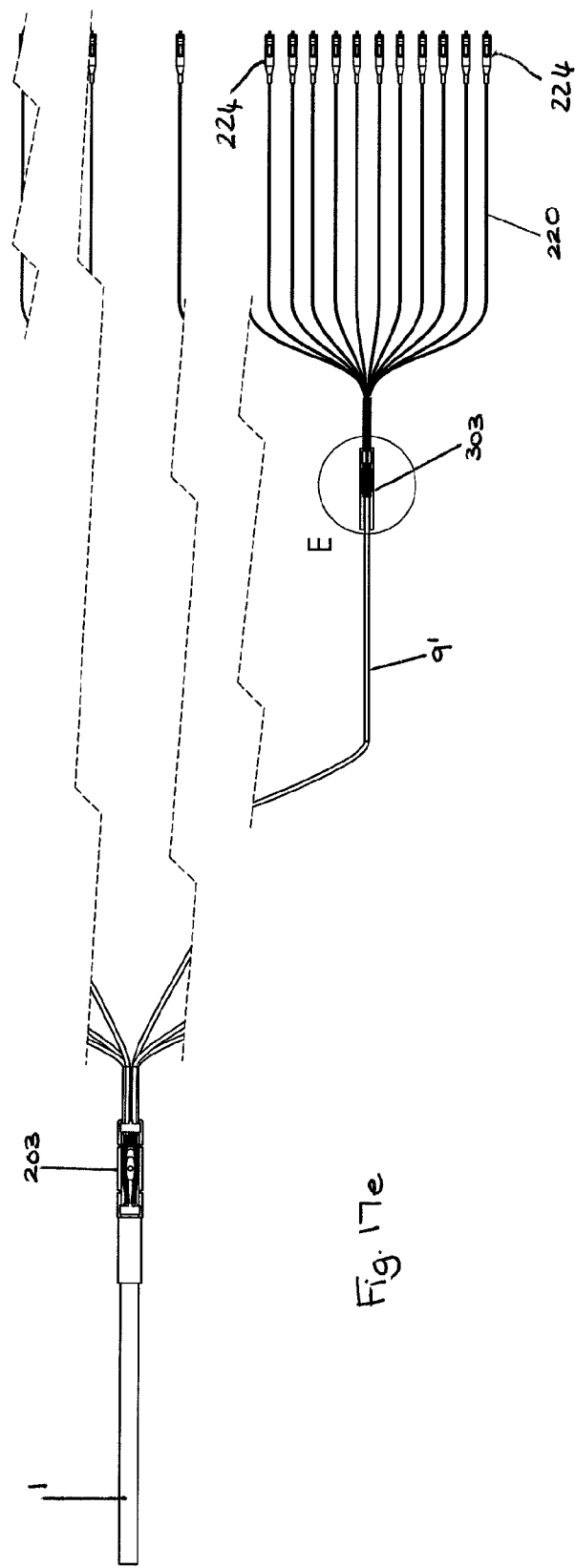
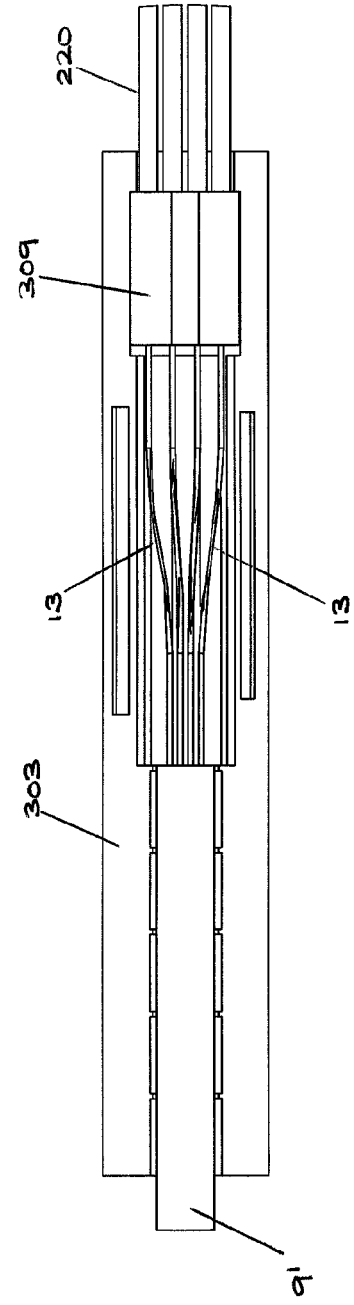
Fig. 17e
Fig. 17f

CONNECTOR DEVICE AND METHOD FOR PRODUCING A FURCATED FIBRE OPTIC CABLE

The present invention relates to a connector device and a method for producing a furcated fibre optic cable, in particular but not exclusively, for telecommunications and networking applications.

When telecommunications and computer equipment is installed at a site that includes units that have to be connected together and/or to external equipment via fibre optic cables, an engineer will visit the site, observe the relative positions of the units and external connection points and will then calculate the number, size and type of fibre optic cables required to make the necessary connections. The engineer then places a bespoke order for the fibre optic cables to a supplier who then produces the cables required.

Cables containing multiple optical fibres are often required for installation and it is common for the cables to be furcated to separate out the individual fibres, or subunits of multi-fibre cables, to connect them to telecommunications/networking units such as patch panels. The individual fibres are too brittle and lack sufficient strength to connect to the patch panel without some form of additional protection. This is often true even when the individual fibres are individually sheathed within the multi-fibre cable since the sheaths used are designed to protect the fibres within the multi-fibre cable structure and not when individually exposed. Typically furcated cables are manufactured by removing a section of an outer sheath/jacket of a multi-fibre cable to expose the individual fibres. Each fibre is then threaded into a new outer sheath that has the required strength, for example because it includes strengthening fibres, such as Aramid fibres. The fibres can be threaded individually into separate sheaths or alternatively several fibres can be threaded into a single sheath. This is a very time consuming process, and hence expensive, and contributes to a significant proportion of the lead time from the installer placing the order to the cables being delivered on site.

At the furcation site, that is in the region where the individual fibres are separated out from the multi-fibre cable, typically an epoxy resin and a wrap comprising for example a plastic film or tape is applied to join the new sheaths to the outer sheath/jacket of the multi-fibre cable to increase the tensile strength of the cable arrangement. This is required because the cables can be treated roughly when installed and significant tensile loads can be applied.

For example, during installation the furcated cables may be pulled through ducting or ceiling spaces either manually or with winch type equipment. If the cable snags, the installer will pull harder, sometimes using his body weight to overcome the snagging. It has been found by the inventors that the traditional epoxy resin and wrap joint does not perform well in these circumstances and the cable can fail. Also, when the wrap and epoxy resin is applied during manufacture it has been found that the technique can cause some of the fibres to bend or kink unacceptably in the region of furcation, which degrades the optical qualities of the fibre.

As an alternative to epoxy resin and a wrap, it is known to use a casing that clamps onto the outer jacket of the multi-fibre cable. However this type of arrangement provides a relatively poor connection and means of transmitting tensile load between fibres.

It is also known to provide a casing that is connected to a multi-fibre cable by inserting a connector body into the end of a fibre optic cable such that fibrous strength members that are contained within the cable splay outwards and lie over an outer surface of the connector member, and subsequently clamping strength members to the connector member. The connector member is then inserted into the casing. While this arrangement is preferable to the mechanical clamping arrangement mentioned above, it does not make the best use of the strengthening members. Furthermore this type of connector has a large number of components, which slows the assembly process, thereby increasing the lead time to delivery. Since a typical order may require may hundreds, or in some cases thousands, of bespoke cables simplifying the design of the connector device so that it can be assembled more quickly is desirable. However this has to be balanced against the performance of the connector device.

When making a furcated joint with the known mechanical arrangements described above, the fibres being furcated are exposed and threaded into new sheaths as described above. Also, for each of the mechanical connector devices described, the new multiple fibres are attached to the connector devices by bonding them to a furcation support member with an epoxy resin. This is an inherent weakness of those types of connection members since that arrangement transfers loads from the connector device to the new cables via the outer sheaths, which are typically weak.

Accordingly the present invention seeks to provide an improved optical fibre cable connector device and a method for producing a furcated fibre optic cable that mitigates at least one of the aforementioned problems, or at least provides an alternative to existing approaches.

According to one aspect of the invention there is provided a connector device for connecting a first fibre optic cable to a plurality of second fibre optic cables, said connector device including a casing having a first opening arranged to receive the first fibre optic cable, a second opening arranged to receive the plurality of second fibre optic cables, a cavity that connects the first and second openings such that a fibre connection can be made between the first fibre optic cable and the plurality of second cables, and first and second parts that are connectable to each other; and securing means for securing the casing to the first fibre optic cable and to the plurality of second fibre optic cables such that when secured thereto the casing transfers tensile loads between the cables, wherein the securing means includes a furcation member that is arranged to receive and support the plurality of second fibre optic cables.

The connector device improves the mechanical strength at a furcation site and provides a casing that protects the section of fibres housed therein and provides adequate internal space to ensure that the fibres do no kink and are not bent beyond their tolerances.

Advantageously the furcation member can include a body having a plurality of bores formed therein that are arranged to receive and support the plurality of second fibre optic cables. The plurality of bores are arranged substantially parallel to one another and extend through the body from a first end face to a second end face.

Advantageously the securing means can include means for clamping, or otherwise connecting, strengthening members in the plurality of second fibre optic cables to the connector device such that tensile loads can be transferred from the second fibre optic cables to the connector device mainly via the strengthening members.

Advantageously the furcation member can include a protruding portion that is arranged such that the strengthening members contained within the plurality of fibre optic cables can be clamped thereto. For example, some fibre optic cables include fibrous strengthening members, such as Aramid fibres, that surround the optical fibre. These fibres can be exposed by removing a portion of cable sheathing and clamping them to the protruding portion, for example by crimping or with some other kind of clamping element. Preferably the protruding portion is substantially axially aligned with the bores. Preferably the protruding portion extends from a central portion of one of the first and second end faces. The protruding portion may optionally include at least one formation such as at least one rib or recess to improve the retaining function of the clamping member. For low tensile applications, fibre optic cables that do not include strengthening elements can be used and these types of cables do not require a protruding portion. These types of cables are preferably fixed to the casing by bonding them to the furcation member with a suitable cement such as an epoxy resin or other type of suitable adhesive.

Advantageously the furcation member is located within the casing towards the second opening and is preferably a separate component from the casing. The furcation member is located in the casing in a manner such that the plurality of bores are substantially axially aligned with the first fibre optic cable. This, together with shape and size of the casing cavity, helps to ensure that individual fibres are not bent or kinked beyond their tolerances, to avoid degradation of the optical qualities of the fibres.

Advantageously the axial position and/or rotational orientation of the furcation member can be fixed relative to the casing.

Advantageously the casing can include a formation, such as a recess, that is arranged to receive and interact with at least a part of the furcation member to fix its axial position relative to the casing. For example, the casing can include an annular recess in which the furcation member is located which locks its axial position with respect to the casing.

Advantageously the casing can include a formation that is arranged to receive and interact with at least a portion of the furcation member to fix its rotational orientation with respect to the casing. Preferably one of the furcation member and the casing includes at least one locking element that engages with a recess in the other of the furcation member and the casing to lock the furcation member's rotational orientation relative to the casing.

Advantageously the securing means can include means for clamping, or otherwise connecting, strengthening members in the first fibre optic cable to the connector device.

Advantageously the securing means can include a connector member having a tubular body therein that is arranged to receive the first fibre optic cable therein and a clamping member, the arrangement being such that when the first fibre optic cable is inserted into the tubular body at least one of the strengthening members can be folded backwards over an external surface of the tubular body and clamped thereto with the clamping member. This provides a very strong arrangement that can withstand large tensile forces.

The tubular body can include a shoulder portion towards one end and a tail portion towards the other end.

Advantageously the shoulder portion can include at least one formation, such as a channel, for receiving at least one of the strengthening members contained within the first fibre optic cable. This enables the full cross-section of the first fibre optic cable to be inserted into the bore from the opposite end of the tubular body from that of the shoulder portion and for fibrous strengthening members, for example, in the first fibre optic cable to be folded back over the shoulder portion to lie within the or each channel and to extend over a tail portion of the tubular body, wherein the first fibre optic cable is fixable to the tubular body by clamping the fibrous strengthening members thereto by crimping or using some other clamping member. For example, some fibre optic cables include fibrous strengthening members, such as Aramid fibres, that surround the optical fibres. The Aramid fibres can be exposed by removing a portion of cable sheathing and clamping them to the tail portion. Advantageously the shoulder portion can include a plurality of channels, and preferably the channels are evenly distributed around the shoulder portion.

Advantageously the tail portion of the tubular body can be tapered, or include a tapered part, and the connector device includes an annular clamping member for clamping fibre optic cable strengthening members to the tail portion. Thus at least part of the tail portion is substantially frusto-conical with the wider portion oriented towards the shoulder portion. This arrangement has the advantage that as the tensile load applied to the fibre optic cables increases so does the clamping load applied to the strengthening members since the strengthening members act on the clamping member to pull it along the tail portion in the direction of increasing diameter thereby squeezing the strengthening members between the annular clamping member and the tail portion. Typically the taper angle is in the range 5 to 15 degrees. Advantageously the tail portion may optionally include at least one formation such as at least one rib or recess to improve the retaining function of the clamping member. Alternatively the tail portion can be substantially smooth. For low tensile loading applications, a multi-fibre optical cable can be used that does not include strengthening elements. In this application, the connector member cable does not require channels formed in the shoulder portion. These types of cables are preferably fixed to the casing by bonding them to the connector member with a suitable cement such as an epoxy resin. Advantageously the tubular body can include at least one aperture formed therein to enable cement to be inserted into the body to bond the connector member to the first fibre optic cable. Preferably the tubular body includes a plurality of apertures and each aperture is arranged substantially orthogonal to the bore.

Advantageously the connector member can be located towards the first opening of the casing and is preferably a separate component from the casing. Advantageously the axial position and/or the rotational orientation of the connector member can be fixed relative to the casing. Preferably the connector member is partly located within the casing such that the tail portion protrudes from the casing via the first opening. Having the tail portion protrude from the casing provides support for an outer seal, such as a rubber sheath to prevent the ingress of water into the casing. Advantageously the casing can include a formation, such as a recess, that is arranged to receive and interact with at least a portion of the connector member, such as the shoulder portion, to fix its axial position relative to the casing. For example, the casing can include an annular recess in which the shoulder part of the connector member is located, the arrangement locking its axial position with respect to the casing. Advantageously the casing can include a formation that is arranged to receive and interact with at least a part of the connector member to fix the connector member's rotational orientation with respect to the casing. Preferably one of the connector member and the casing includes at least one locking element that engages with a recess in the other of the connector member and the casing to lock the connector member's rotational orientation relative to the casing.

Advantageously the casing can be elongate and is arranged such that the first and second parts are separable from each other along the length of the casing. This enables the casing to be applied to the cables without having to thread the first and second parts onto the cables. Advantageously the first and second parts can be similar. Preferably the casing comprises a substantially cylindrical hollow body that is separable into first and second parts, wherein the cavity comprises a substantially axial bore and the first and second openings are located at first and second ends of the body and are substantially axially aligned. This provides a very compact arrangement which is useful as for some installations hundreds, or in some cases thousands, of cables can be installed in limited spaces.

Advantageously the first and second parts of the casing are releasably connectable to each other.

Advantageously the casing can be made from a plastics material and the first and second parts of the casing are arranged to snap-fit together. The inventors have found that having a plastics casing provides sufficient tensile strength for many fibre optic cabling applications and is significantly cheaper to produce than an aluminium casing. It will of course be appreciated by the skilled person that the casing can be made from metals such as aluminium when required. In this case, the first and second parts can be releasably attached together using at least one screw element. For example, the connector device can include a pillar having a longitudinal bore that includes internal screw threads at each end and the casing can include holes arranged substantially orthogonally to the axis of the casing. The pillar can be located so that its internal screw threads are aligned with the holes and the first and second parts of the casing can be connected together by inserting screws into the pillar via the holes formed in the casing. It will be appreciated by the skilled person that the pillar can be integrated with one part of the casing and when so arranged includes a single internal screw thread, wherein the other part of the casing includes a hole and the parts are connected together with a single screw element. Advantageously the connector device can include a plurality of pillars. The pillar can be substantially cylindrical in shape or can have a substantially oval cross-section.

Advantageously the connector device can include means for clamping, or otherwise attaching, a wire-like fibre optic cable strengthening member to the connector device.

Advantageously the means can include a first clamping member that is arranged to receive the strengthening member from an axial direction and a second clamping member that is arranged to clamp the strengthening member to the first clamping member in a direction that is substantially orthogonal to the axial direction. Advantageously the first clamping member can include the pillar that is used to connect the first and second parts of the casing together. This helps to keep the number of parts in the connector device to a low number. The pillar can include a bore formed therein that is arranged substantially orthogonal to the threaded bore, the arrangement being such that when the strengthening member is located in the bore, it is clamped to the pillar by inserting screw elements into the threaded bore. Since the pillar is fixed to the casing by the screw elements, the first fibre optic cable is also fixed to the casing.

Advantageously the securing means can include cement for bonding the wire-like strengthening member to the connector device, in addition to, or as an alternative, to the clamping arrangement described above. The cement can be, for example an epoxy resin or other type of suitable adhesive.

Advantageously the connector device can include at least one passive optical device located within the casing that is connectable with the multi-fibre optical cable and the plurality of second optical cables. The passive optical device can be any of the following: a splitter, a wave division multiplexer (WDM) and a wave division demultiplexer (WDD). The connector device can include any suitable passive optical device.

Advantageously the casing can be constructed and arranged to clamp directly onto the first fibre optic cable and firmly grip the cable when the first and second parts are secured together. This can be achieved by dimensioning the cavity to tightly fit around the first cable when the first and second parts are joined. This is advantageous since a separate connector member is not required. This arrangement is best suited for low tensile force applications.

Advantageously the casing can include at least one formation for attaching the casing to a support member. Preferably the casing includes a plurality of recesses formed in its outer surface to enable the casing to engage with rails, for example located in a cabinet that houses telecommunications equipment.

According to another aspect of the invention there is provided a fibre optic cable assembly including a first fibre optic cable, a plurality of second fibre optic cables, and a connector device according to any configuration described herein, wherein the first fibre optic cable is connected to at least some of the plurality of second fibre optic cables either directly or via an intermediate component.

Advantageously the first fibre optic cable can be a multi-fibre optical cable that is furcated within the casing. The second fibre optic cables can comprise single fibre cables or multi-fibre cables depending on the type of multi-fibre cable used. For example, if a first cable having 96 fibres arranged in 8 subunits of 12 fibres is furcated to separate its subunits, then 8 second fibre optic cables each comprising 12 fibres are connected to the subunits in one to one relationships. If a first cable having 12 fibres is furcated then 12 second fibres each having a single fibre can be connected thereto in one to one relationships.

Alternatively the first fibre optic cable can be a single fibre cable that is connected to an intermediate component such as a passive optical device, which is connected to the plurality of second fibre optic cables.

Advantageously the first fibre optic cable can include at least one of: fibrous strengthening members and a wire-like strengthening member, such as a central metallic chord, plastic chord or fibre reinforced plastic chord, and wherein at least one of the strengthening members is clamped, or otherwise connected, to the connector device such that tensile loads are transferred between the first fibre optic cable and the connector device mainly through the strengthening members.

Advantageously at least some of the second fibre optic cables include fibrous strengthening members, and wherein at least some of the strengthening members are clamped, or otherwise connected, to the connector device such that tensile loads are transferred between the second fibre optic cables and the connector device mainly through the strengthening members.

Advantageously the fibre optic cable assembly can include a plurality of third fibre optic cables and at least one further connector device according to any one of claims 1 to 20 connected to one of the second fibre optic cables and the plurality of third fibre optic cables. This provides a second furcation stage. It will be apparent to the skilled person that additional furcation stages can be applied if required. Advantageously the first, second and/or third fibre optic cables can have different constructions, for example the number of fibres, the arrangement of strengthening members and protective sheaths.

According to another aspect of the invention there is provided a fibre optic cable assembly having a plurality of furcation junctures wherein at each of first and second furcation junctures there is provided a connector device including a casing having first and second openings, a cavity that connects the first and second openings, and first and second parts that are connectable to each other; and securing means for securing the casing to a first fibre optic cable and to a plurality of second fibre optic cables, and/or plurality of cable sheaths, such that when secured thereto the casing transfers tensile loads between the cables, wherein the securing means includes a furcation member that is arranged to receive and support the plurality of second fibre optic cables, and/or the plurality of cable sheaths.

At each furcation juncture the fibres of the input fibre optic cable, that is the cable having the greater number of fibres, can either be connected to new fibre optic cables, for example by fusion splicing, or can be threaded into new sheaths, for example sheaths of the type that include fibrous strength members, in the traditional manner.

Advantageously each of the connector devices can be arranged according to any configuration described herein. It will be appreciated by the skilled person that different connector devices in accordance with the invention can be used at each furcation juncture.

The first and second furcation junctures are arranged in series and the first and second connector devices are connected together by one of the second fibre optic cables, or cable sheaths. Advantageously the fibre optic cable assembly can include additional furcation junctures and connector devices. For example, the fibre optic cable assembly can include a plurality of second furcation junctures, that is furcation junctures that follow the first furcation juncture, and a plurality of third furcation junctures, that is furcation junctures that follow the second furcation junctures. Advantageously the fibre optic cable assembly can include connector devices arranged according to any configuration described herein at each of the third furcation junctions. It will be apparent to the skilled person that at least one additional furcation stage can be included in the fibre optic cable assembly.

According to another aspect of the invention there is provided a method for producing a furcated fibre optic cable, said method including providing a first fibre optic cable comprising a multi-fibre optical cable, exposing a section of the fibres contained therein, providing a plurality of second fibre optic cables and exposing a section of the fibres contained therein, connecting at least some of the fibres in the multi-fibre optical cable to the second fibre optic cables, and applying a connector device according to any configuration described herein to house the exposed fibres and to increase the tensile strength between the first and second cables.

Connecting the multi-fibre optical cable to the second fibre optic cables enables pre-existing fibre optic cables to be used instead of having to thread the fibres from the multi-fibre cable into new sheaths. This significantly decreases the amount of time that it takes to produce the furcated multi-fibre cable. The inventors have found that they can decrease the time that it takes to manufacture furcated cables by around 50% by connecting pre-existing cables to a multi-fibre cable instead of using the traditional technique of inserting the fibres from the multi-fibre cable into new sheaths.

Advantageously the method can include fusing the fibres together, for example using a fusion splicing process. It will be appreciated by the skilled person that other known techniques for joining optical fibres together can be used. However, fusion splicing is preferred because of the quality of the joint produced, which does not significantly degrade the optical qualities of the joined fibres, and the speed at which the fibres can be joined.

Advantageously the method can include threading the plurality of second cables through a furcation member prior to connecting them to the multi-fibre cable.

Advantageously the method can include threading a connector member onto the multi-fibre cable prior to connecting it to the second fibre optic cables.

Advantageously the method can include threading a clamping member onto the multi-fibre cable prior to connecting it to the second fibre optic cables.

The first fibre optic cable can include at least one strengthening member, and the method can include inserting the first fibre optic cable into a first end of a tubular connector member such that at least one of the strengthening members protrudes from a second end of the tubular connector member, folding the or each strengthening member backwards over an outer surface of the connector member and clamping the or each strengthening member to the connector member.

The first fibre optic cable can include fibrous strengthening members and the connector device includes a connector member and the method can include attaching the fibrous strengthening members to the connector member and attaching the connector member to the casing. The fibres are attached to the connector member, for example by crimping or using a clamping member. Advantageously the connector member is releasably attached to the connector device.

The first fibre optic cable can include a wire-like strengthening member, such as a metallic or fibre reinforced plastic chord, and the method includes clamping the wire-like strengthening member to the connector device.

At least some of the second fibre optic cables can include at least one strengthening member, and the method includes attaching the or each strengthening member to the connector device.

At least some of the second fibre optic cables can include fibrous strengthening members and the connector device includes a furcation member, and the method includes attaching the fibrous strengthening members to the furcation member and attaching the furcation member to the casing. Advantageously the furcation member is releasably attached to the casing.

Advantageously the method can include connecting the multi-fibre optical cable to the second fibre optic cables by fusing them together.

Embodiments of the present invention will now be described, by way of example only, with reference to the accompanying drawings in which:

FIG. 3 is an isometric view of a connector device according to a first embodiment of the invention;

FIGS. 4a to 4e are views of a casing from the connector device of FIG. 3;

FIGS. 6a to 6d are views of a furcation support element from the connector device of FIG. 3;

FIGS. 7a to 7d are views of a multi-fibre cable connector element from the connector device of FIG. 3;

FIGS. 9a to 9d are views of the connector device of FIG. 3 connecting a single multi-fibre cable to a plurality of optical fibre cables;

FIGS. 12a to 12d show two alternative support columns;

FIGS. 13a to 13c show a first alternative casing;

FIGS. 15a and 15b show a second embodiment of the invention that includes a passive optical element;

FIGS. 16a and 16n show a third embodiment of the invention that does not include a multi-fibre cable connector element; and FIGS. 17a to 17f show a furcation arrangement having first and second furcation stages A,E, wherein FIG. 17b is an enlarged view of the first furcation stage A, FIG. 17d is an enlarged view of the second furcation stage E, and FIG. 17f is an enlarged view of the second furcation stage E in an alternative arrangement.

Figure 1:
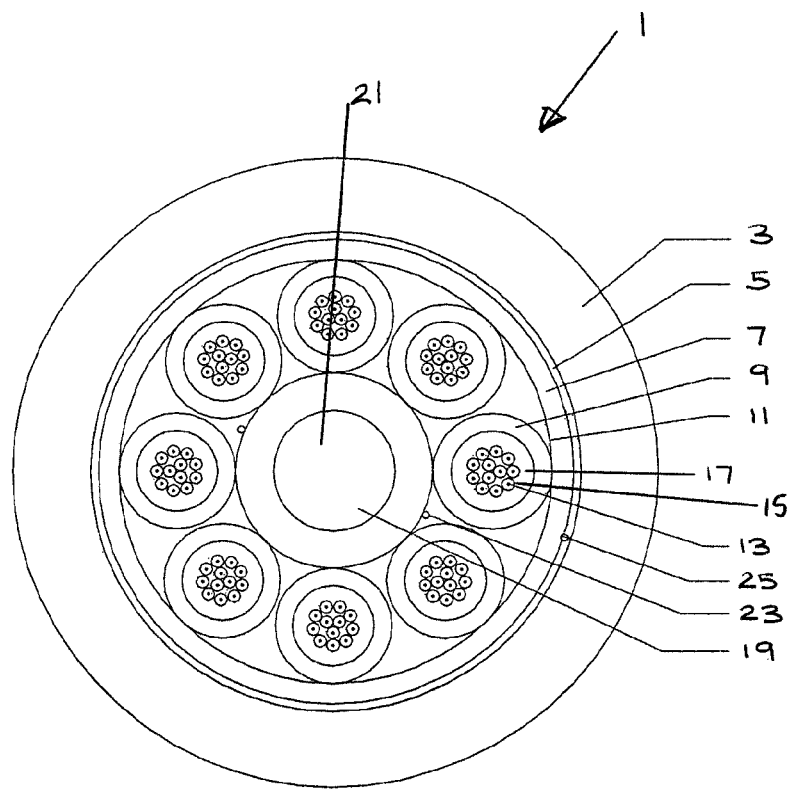
FIG. 1 is a sectional view of a multi-fibre optical cable, having eight multi-fibre subunits, wherein each subunit includes 12 fibres.

FIG. 1 is an example of a first type of multi-fibre optic cable 1. The cable includes an outer jacket 3, which is typically a low smoke zero halogen jacket, e-glass non-metallic strength members 5 (which also act as a water blocking layer) an absorbent tape 7 for absorbing moisture/water, eight multi-fibre subunits 9, each having a helical core binder 11 and twelve 250 µm fibres 13 each having a plastics material sheath 15, and a gel-filled core 17. The cable 1 also includes a central strength member 19 that is made from fibre reinforced plastic and has an outer jacket 21, an absorbent thread 23 and a rip cord 25. This type of cable 1 carries a large number of fibres, 96 are shown in FIG. 1. However, it will be apparent to the skilled person that a different number of subunits 9 can be included within the outer jacket 3 and a different number of fibres 13 can be included in each subunit 9.

Figure 2:
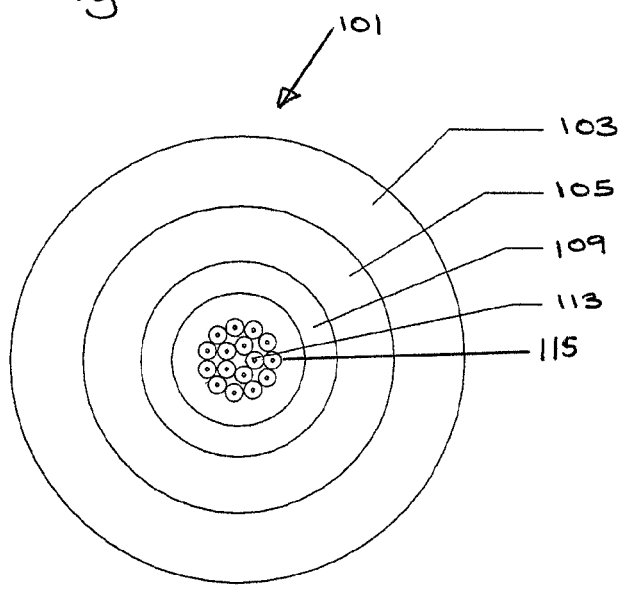
FIG. 2 is a cross section of a multi-fibre optical cable having sixteen fibres.
Figure 5A:
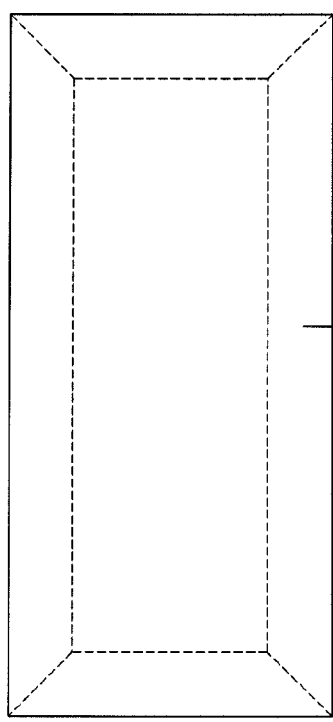
FIGS. 5a to 5d are views of a support column from the connector device of FIG. 3.
Figure 5B:
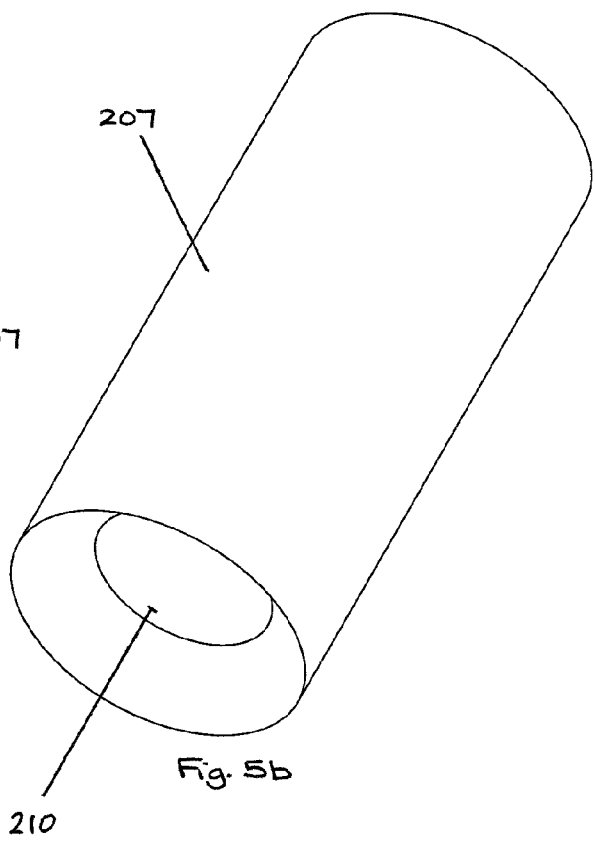
Figure 5C:
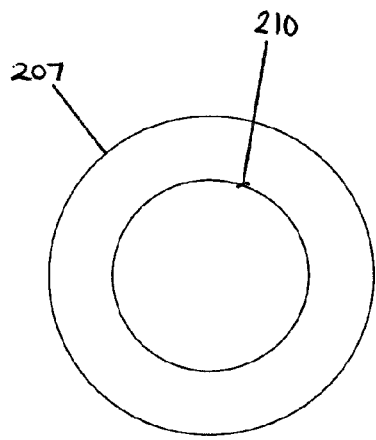
Figure 5D:
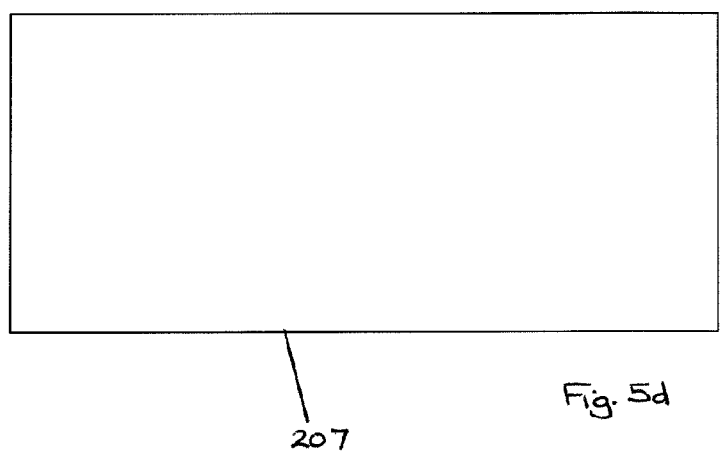
Figure 8B:
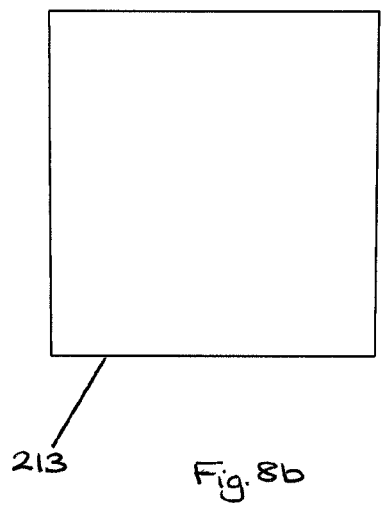
FIGS. 8a to 8d are views of a clamping element from the connector device of FIG. 3.
Figure 8A:
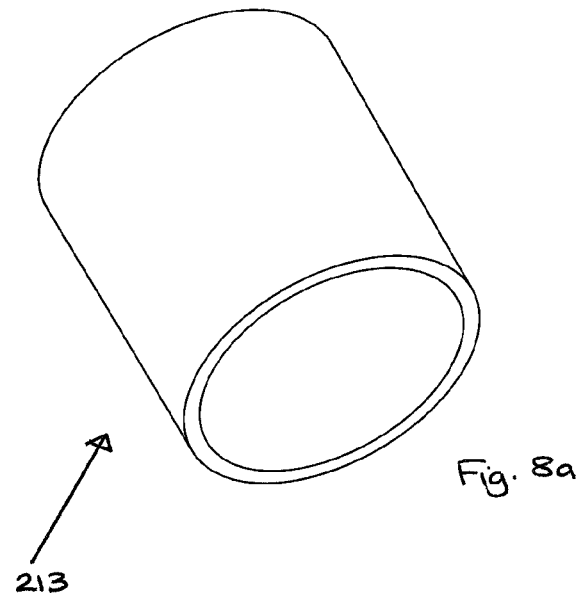
Figure 8C:
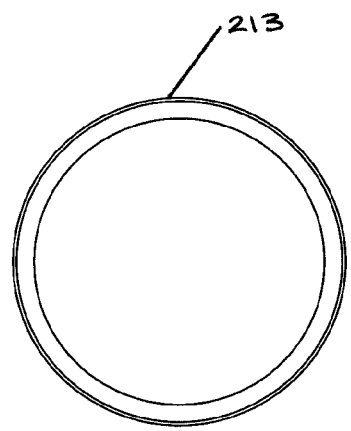
Figure 8D:
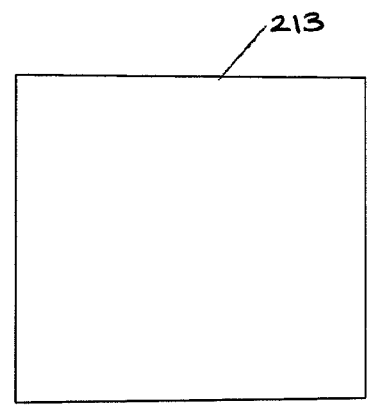

An alternative type of multi-fibre cable 101 is shown in FIG. 2. That cable 101 includes an outer jacket 103, water blocking Aramid strength members 105, an inner tube 109 for blocking water and sixteen 250 µm optical fibres 113, each having a plastic sheath 115.

FIG. 3 shows a connector device 203 for providing additional mechanical strength for a multi-fibre cable 1,101 at a furcation juncture. The connector device 203 includes a casing 205 having first and second parts 205a,205b, a connector column 207, a cable furcation support element 209, a cable connector element 211 and a clamping element 213.

The casing 205 is tubular and has a substantially cylindrical form that is open at each end 204,206. The casing is elongate and comprises first and second similar parts 205a,205b that are releasably connectable to each other. Having substantially identical first and second parts 205a,205b reduces the manufacturing cost. The cylindrical body is split longitudinally across its diameter into two halves. The casing has a typical length in the range 50 to 70 mm, and preferably approximately 60 mm and a diameter in the range 5 to 25 mm.

Each part of the casing 205a, 205b includes a first recess 215 for receiving the furcation support element 209 formed in the interior face of the curved wall 216 of the casing. The recess 215 includes a first channel 217 formed in the internal face of the curved wall 216 that is contiguous with the first recess 215 and is arranged substantially perpendicular thereto and substantially parallel with the longitudinal axis of the casing. Each part of the casing 205a,205b includes a second recess 219 that is arranged to receive a part of the connector element 211 and is formed on the internal face of the casing 216. The second recess 219 includes a second channel 221 that is contiguous with the recess 219 and arranged substantially co-axially with the first channel 217. When the two halves of the casing 205a, 205b are positioned together the first and second recesses 215,219 are substantially annular, the first channels 217 are arranged substantially diametrically opposite each other, as are the second channels 219.

Each part of the casing 205a,205b includes a through hole 223 that extends through the curved wall 216 of the casing and is arranged centrally along the length of the casing 205. When the two halves of the casing 205a, 205b are fitted together the holes 223 are substantially axially aligned. The support column 207 is arranged to fit between the holes 223 and includes an internal thread 210 at each end to receive a screw element (not shown) for fixing the two parts 205a, 205b of the casing together, that is one screw element at each end (see FIGS. 3 and 5a to 5d).

The casing 205 and the support column 207 are metallic and are preferably made from aluminium. The casing 205 includes four slots 225 formed in its external face. The slots 225 enable the casing 205 to be slotted onto rails or similar for fixing to external equipment.

The cable connector element 211 includes a frusto-conical portion 227 and a cylindrical portion 229 having four slots 231 formed in its outer surface (see FIGS. 7a to 7d). The slots 231 are evenly distributed about the circumference of the cylindrical portion 229, with each pair being substantially diametrically opposite each other. The cylindrical portion 229 also includes two tabs 233 extending from an end face 235 thereof. The tabs 233 are arranged substantially parallel with the longitudinal axis of the cable connector element 211 and extend in the opposite direction to the frusto-conical portion 227. The cable connector element 211 includes a central bore 237 that extends through the frusto-conical and cylindrical portions 227,229. The angle of inclination $\theta$ of the conical portion 227 is typically in the range 5 to 15 degrees.

FIGS. 8a-d show a clamping element 213 that is arranged to clamp cable strengthening members 5,105 to the cable connector element 211.

FIGS. 6a-6d show views of the furcation support element 209. The furcation support element includes a cylindrical body 239 having first and second end faces 241,243 and a plurality of holes formed through the body 239 from the first end face 241 to the second end face 243. In the arrangement shown in FIG. 6d there are twelve through holes 245 that are arranged substantially parallel to the longitudinal axis of the cylindrical body 239. The holes are arranged in two sets of six, wherein adjacent holes overlap with each other, as can be seen in FIG. 6d. The overlapping arrangement ensures that there is sufficient space for each cable. The holes 245 are for receiving fibre optic cables 220 (see FIGS. 9a and 9b), which can be multi-fibre cables or single fibre cables. The size and arrangement of the holes 245 is dependent upon the type of fibre optic cable being used (some alternative furcation elements are shown in FIGS. 10a-10d for different types of cable—see below). The furcation support element 209 includes first and second tabs 247 extending from the peripheral portion of the second end face 243. The tabs 247 are arranged diametrically opposite each other. A shaft 249 protrudes from a central portion of the first end face 241 and is arranged substantially coaxial with the longitudinal axis of the cylindrical body 239. The shaft 249 includes a series of ribs 251, the arrangement of the shaft and ribs 249,251 enables strengthening members of the fibre optic cables 220 to be attached thereto by crimping or some other fixing arrangement. The furcation support element 209 is arranged to fit into the casing 205 such that the cylindrical body 239 fits into the first recess 215, the tabs 247 fit into the first channels 217, and the shaft 249 is located within the tubular casing. The first recess 215 fixes the axial position of the furcation support element 209 relative to the casing. The tabs 247 interact with the first channels 217 to prevent the furcation support element 209 from rotating relative to the casing 205. The cylindrical part 229 of the connector element 211 is arranged to fit into the second recess 219 such that the tabs 233 fit into the second channels 221 and the tail portion extends through the opening in the casing 204. The second recess 217 fixes the axial position of the connector element 211 relative to the casing and the interaction of the tabs 233 with the second channels 221 prevents the connector element 211 from rotating relative to the casing 205. Both the furcation and connector elements 209,211 can be removed from the casing when the casing is opened.

Figure 9C:
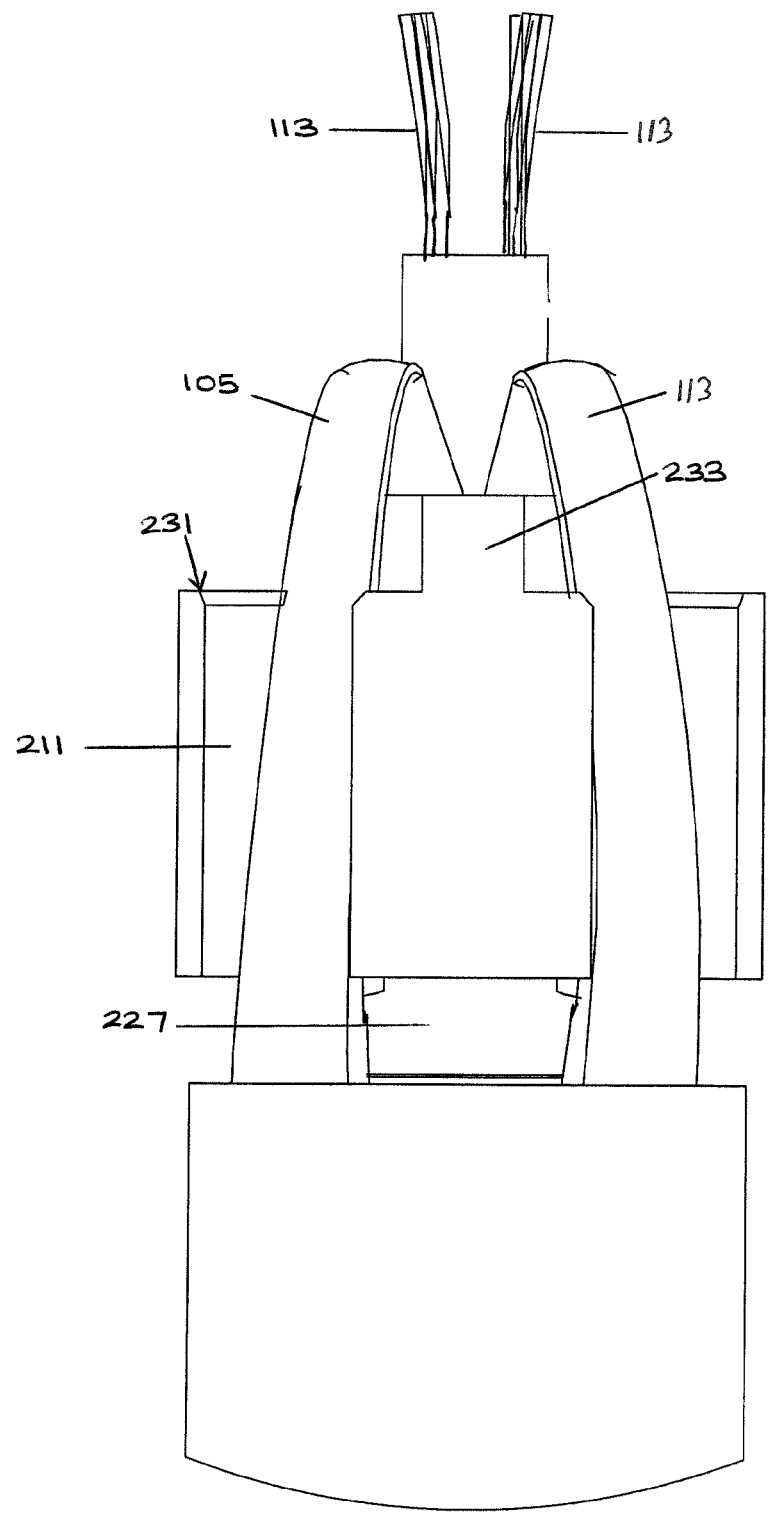
Figure 9D:
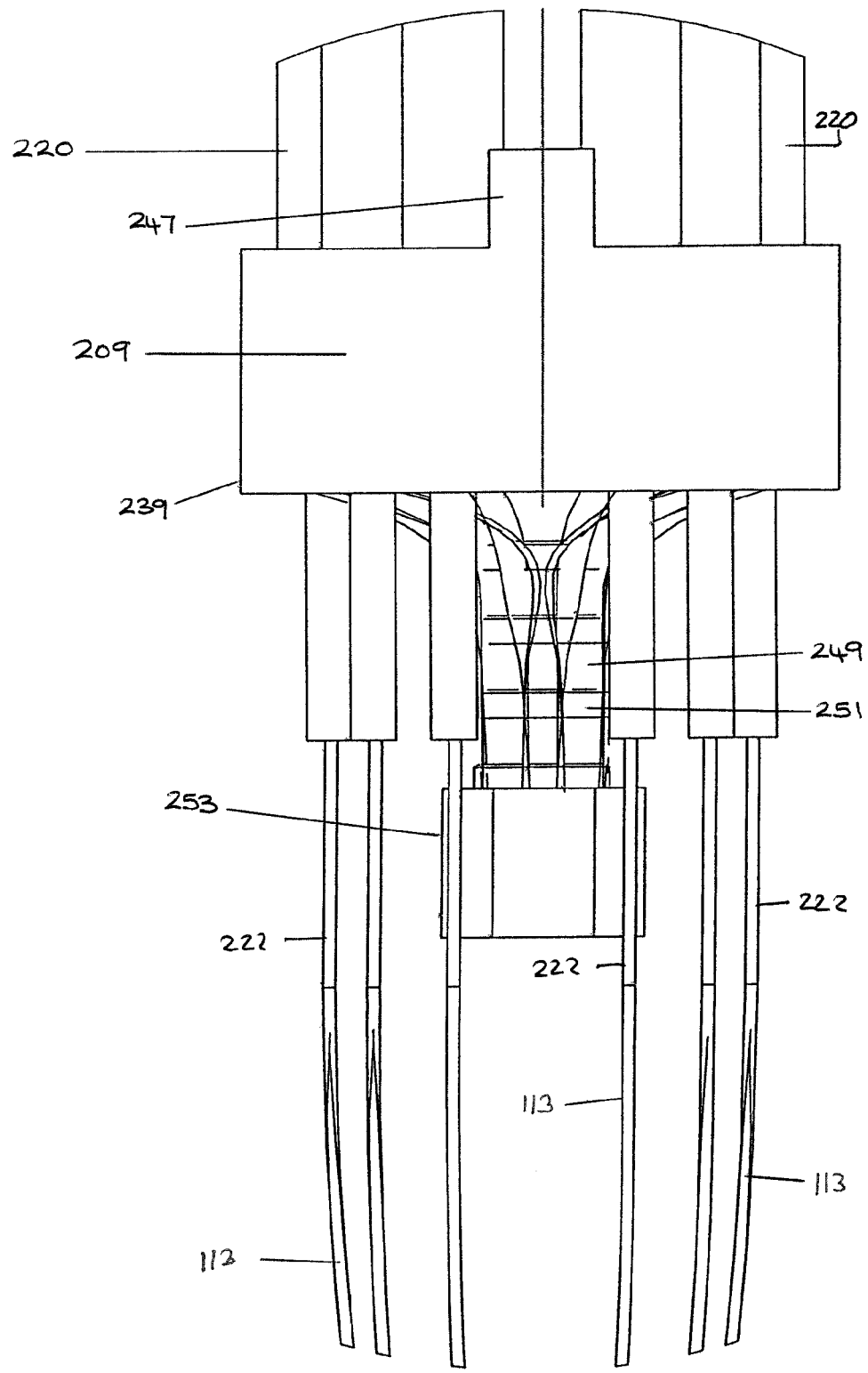

FIGS. 9a to 9b show a multi-fibre fibre optic cable 1;101 at a first furcation site A. In FIG. 9b the fibre optic cable 101 is shown by way of example to illustrate the detail, however it will be appreciated by the skilled person that it can be replaced by the fibre optic cable 1, or some other type of cable. This arrangement is manufactured by starting with the multi-fibre cable 101, hereinafter referred to as the input cable, and removing a section of the outer jacket 103 to expose the individual cable units 9 or fibres 113 (see FIG. 9e: 250). The individual fibres 113 may be sheathed 115 or unsheathed. Pre-existing optical fibres 220, herein after referred to as the output cables 220, each having at least one output fibre 222, are provided. Sections of the output fibres 222 are exposed by removing sections of outer sheathing. The input and output fibres 113,222 are treated to remove any external coatings and are cleaned with a suitable solvent, such as isopropyl alcohol (see FIG. 9e: 252). The clamping ring 213 is threaded onto the multi-fibre cable 101. The cable connector element 211 is then threaded onto the input cable 101. The output cables 220 are pushed through the holes 245 in the furcation support element 209 (see FIG. 9e: 254). The ends of the fibres 113,222 are then cleaved to provide good quality connecting faces (see FIG. 9e: 256). Individual input fibres 113 are then aligned with corresponding individual output fibres 222 on a fusion splicing machine, such as a Fitel S122M12 fusion splicing machine produced by The Furukawa Electric CO., LTD. The fibres 113,222 are then fused together, on a one input fibre 113 to one output fibre 222 basis, by the fusion splicing machine. A heat shrink protective coating is then applied to each joint. This process is repeated until each of the input fibres 113 is connected to an output fibre 222 (see FIG. 9e: 258).

The fibrous strengthening members 105 of the input cable 101 are then pulled over the cylindrical body 229 of the cable connector element 211 such that they lie within the slots 231 and extend over the frusto-conical tail 227. The clamping ring 213 is then forced over the fibrous strengthening members 105 onto the frusto-conical tail 227 thereby clamping the strengthening members to the cable connector element 211. The fibrous strength members of the output cables 220 are wrapped around the shaft 249 on the furcation support element 209 and are crimped thereto with a crimping element 253 (see FIG. 9e: 260).

Figure 9E:
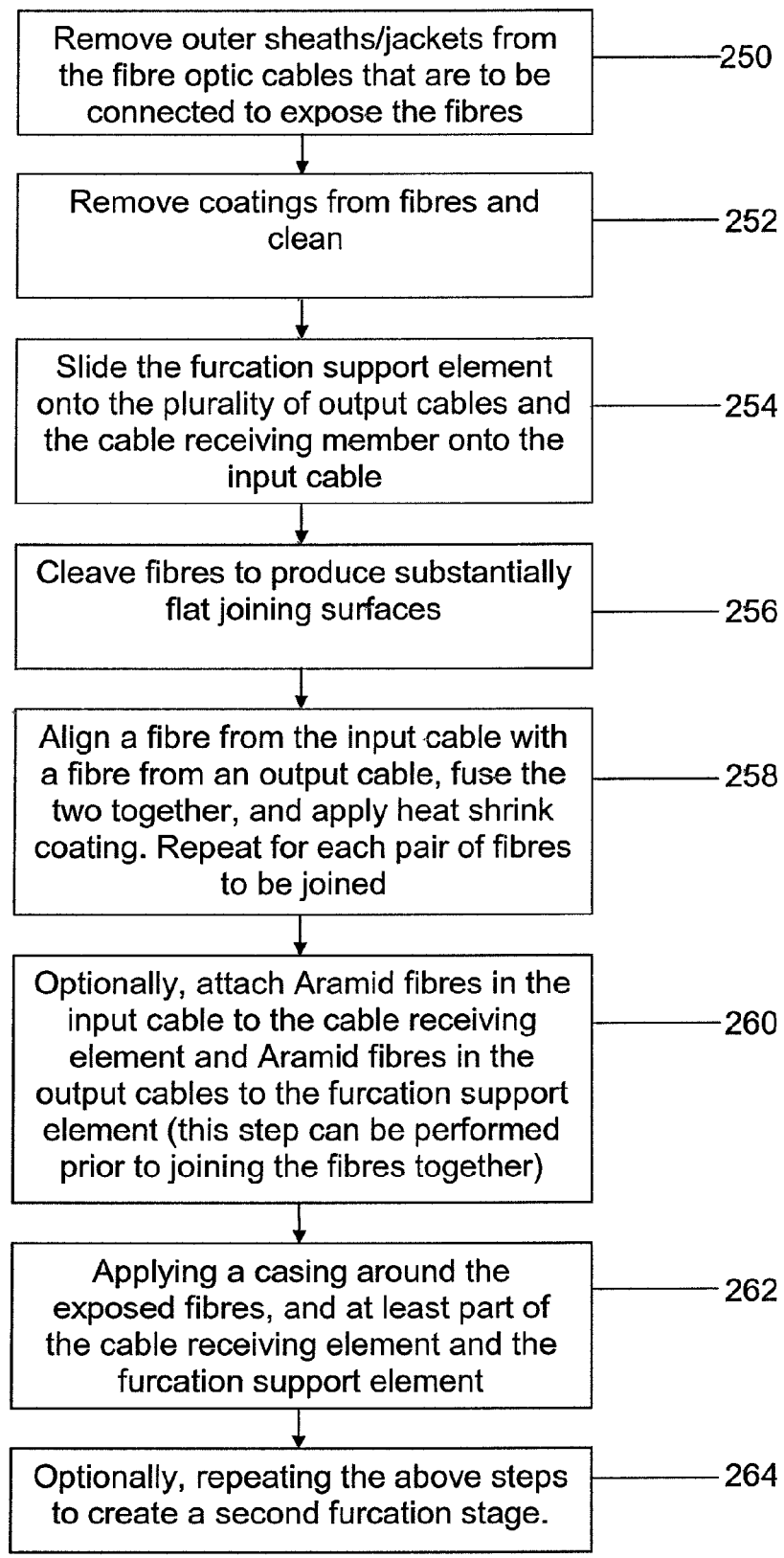
FIG. 9e is a flow diagram of some of the important steps in producing a furcated cable according to the invention using a fusion splicing process.

The casing 205 is then applied to house the exposed fibres 113,222, the cable connector element 211 and the furcation support element 209 (see FIG. 9e: 252). The casing is closed by providing the support column 207 and screwing the two halves of the casing 205a,205b together by inserting screws into the holes 223 and attaching the halves of the casing 205a,205b to the column 207. When the casing 205 is secured it provides additional mechanical strength at the furcation site A to resist tensile forces and also provides a protective shell for the exposed fibres 113,222. The arrangement of the support column 207 is such that the fibres 113,222 are not kinked or bent through too tight a radius which prevents degradation of optical signals from occurring since the fibres are arranged within acceptable limits. If the cables 101,220 are pulled, for example during installation the loads are transferred from the strengthening fibres 105 to the cable connector element 211, the casing 205, the furcation support element 209 and hence to the fibrous strengthening members of the cables 220. This provides a very strong connection which prevents the fibres 113,220 from being damaged when large loads are applied during installation. At the input end, the arrangement of the clamping element is such that applying a load to the input cable 101 causes the fibres 105, to pull the clamping element 213 further up the frusto-conical tail 237 thereby increasing the clamping load on the fibres 105.

Optionally, a rubber jacket 255 can be applied to the end of the cable 1;101 and the casing 205. This is for both aesthetic purposes and to help ensure that moisture and liquids do not enter into the casing 205.

Each output cable 220 may have a connector 224 at its remote end, for example for plugging into the rear of a patch panel (see FIGS. 17a to 17f).

Figure 10A:
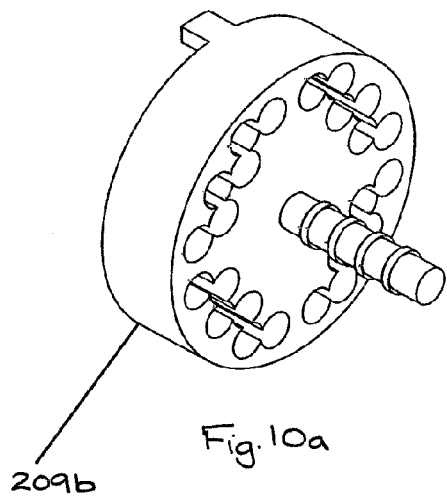
FIGS. 10a to 10d show alternative furcation cable support elements.
Figure 10B:
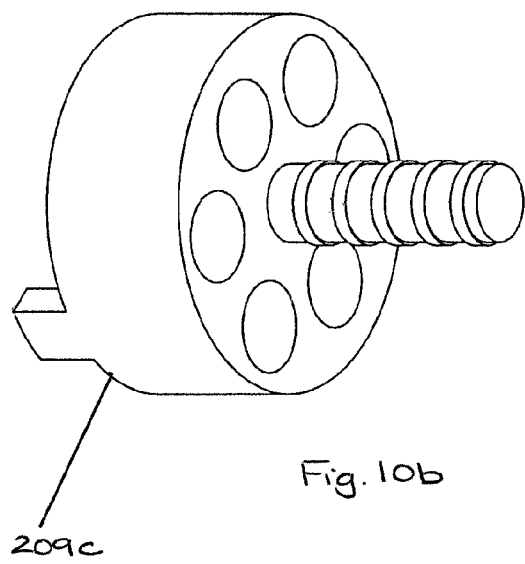
Figure 10C:
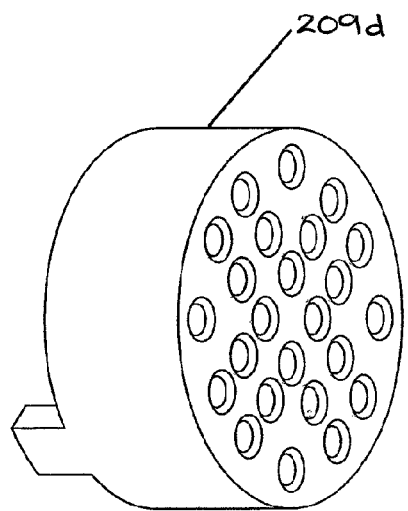
Figure 10D:
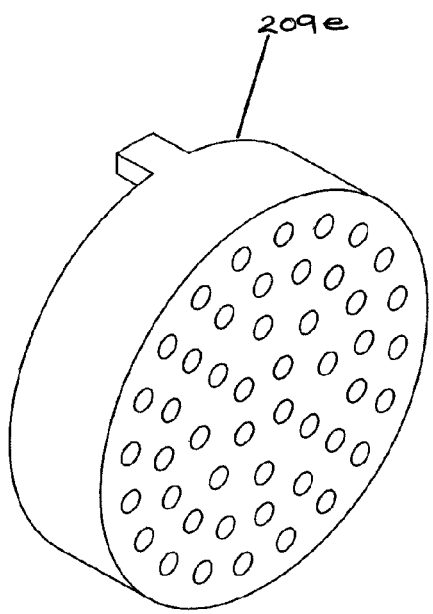

FIGS. 10a to 10d show alternative furcation support elements 209. The number and sizes of the holes formed through the body are determined by the number of fibres to be furcated, for example FIGS. 10a and 10c show two arrangements for 24 fibres, FIG. 10b shows an arrangement for receiving 6 subunits 9. It can also be seen in FIGS. 10c and 10d that it is not necessary to include a shaft 249. For example in the arrangements shown in FIGS. 10c and 10d the individual fibres can be bonded into place using an epoxy resin instead of binding fibre strength elements to the shaft 251. These are particularly useful in applications where the tensile loading applied to the cables is low.

Figures 11A, 11B:
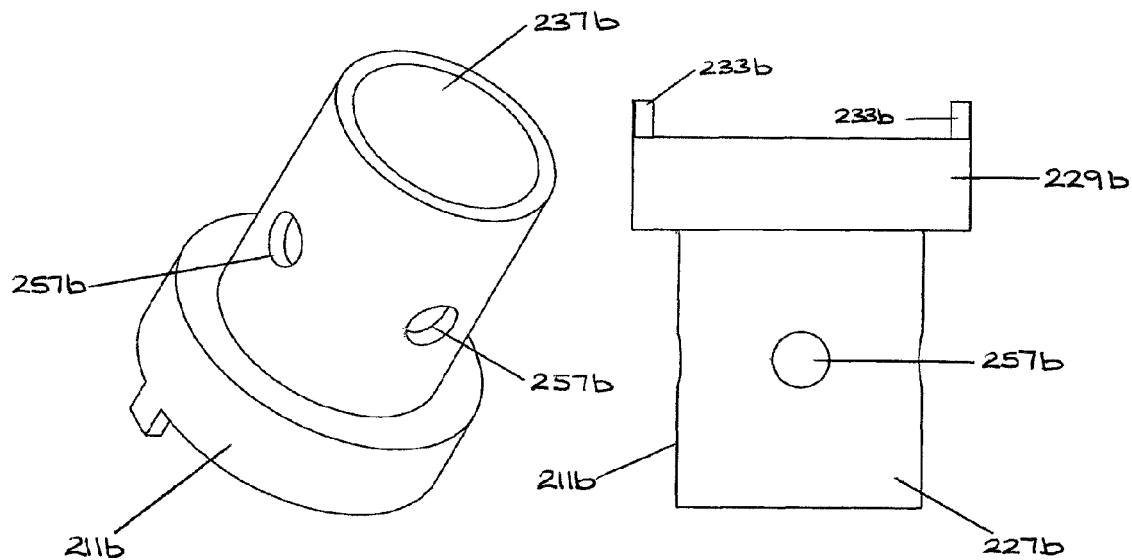
FIGS. 11a to 11d show two alternative multi-fibre optical cable connector elements.
Figures 11C, 11D:
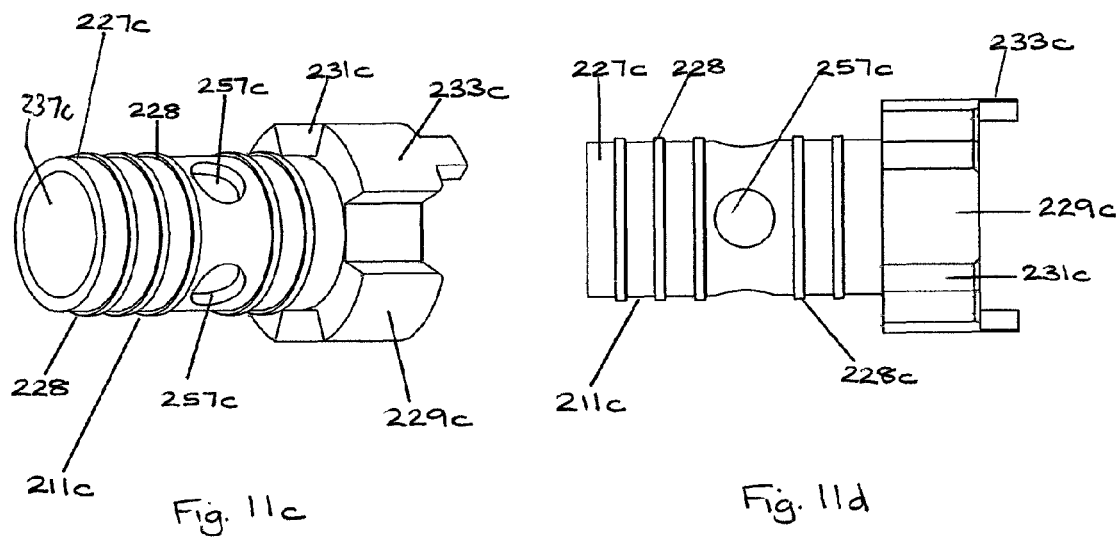
Figure 14A:
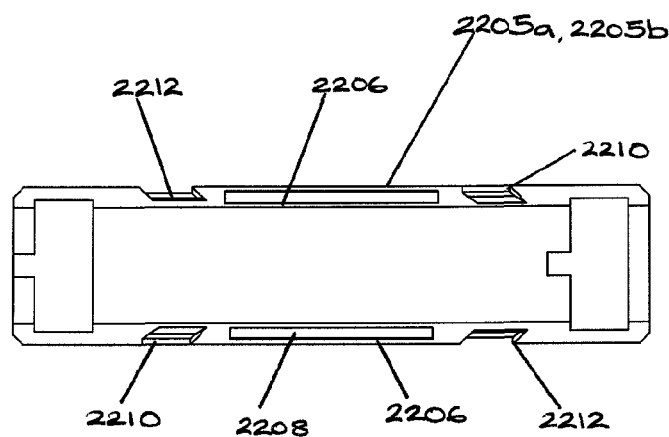
FIGS. 14a to 14d show a second alternative casing.
Figure 14B:
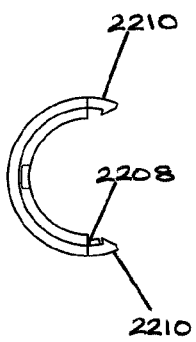
Figure 14C:
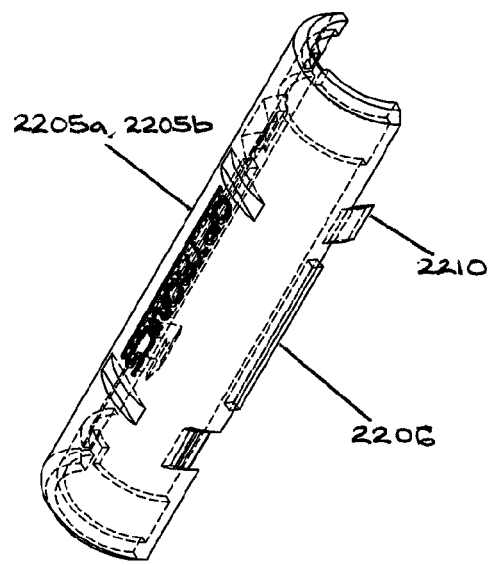
Figure 14D:
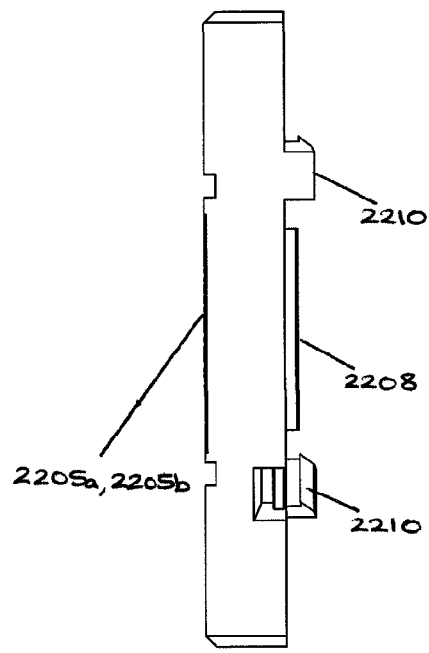

FIGS. 11a to 11d show two alternative cable connector elements (a second version shown in FIGS. 11a and 11b and a third version shown in FIGS. 11c and 11d). The cable connector element 211b includes holes 257 in its tail. The holes 257 allow epoxy resin, or similar, to be injected into the interior of the casing in order to further secure the cable 1;101 in place. This is however an additional bonding means it is not the main means for transferring loads, which is still via cable strengthening members 5,19;105 and the casing 205. It can also be seen that the cable connector element 211b does not include slots formed in the cylindrical part. This type of connector element 211b is used for cables having only central strengthening members 19 or when it is desirable to use only the central strengthening member 19.

The tail part 227c of the third version of the cable connector elements 211c includes ribs 228 to enable the fibrous strength members 5;105 to be crimped thereto with a crimping element.

FIGS. 12a to 12d show two alterative versions of the support column 207b;207c. The main difference between the first support column 207 and the second support column 207b is that it includes a hole 208b that is arranged substantially transverse to the longitudinal axis of the column. The second version 208b is arranged to be used with cables 1 that include a central strength member 19. In this arrangement, the central strength member is arranged to extend into the hole 208b and to be clamped in place by the screw elements when the casing 205a, 250b is secured to the column 207b. The third version of the column 207c is similar to the second version except that instead of having a circular cross section the column has a more oval or elongate cross-section. When the third support column 207c is used a flat 261 is formed in the inner face 216 of the curved wall of each part of the casing 1205a, 1205b to seat the column 207c (see FIGS. 13a to 13c).

FIGS. 14a to 14d show an alternative casing 2205. The casing is made from a plastics material such as Nylon, and preferably Nylon 6-6 with a 15% glass fill, and has a snap fit arrangement. Otherwise, it is similar to the casing 205 for the first embodiment. The snap fit arrangement includes a recess 2206 formed in a central region of the curved wall and arranged substantially parallel to the longitudinal axis of the casing and a complementary ridge 2208 formed opposite. The casing 2205 also includes protrusions 2210 and recesses 2212 that are arranged to receive the protrusions 2210 on the opposing part. The inventors have found that the plastics casing provides sufficient mechanical strength for typical installations and is significantly cheaper to produce than an aluminium casing.

FIGS. 15a and 15b show a furcation site A including a passive optical device 263 that is connected to the input cable 1;101 adjacent the cable connector element 211. The output fibres 222 are connected to the passive optical device 263 and exit the casing 2205 via the furcation support device 209d. The passive optical device may be for example a splitter wherein a single fibre is connected at the input side to the splitter 263, multiple output fibres 222 are connected to the output side of the splitter 263 and wherein the signal carried by the individual input fibre is transferred to each of the individual outgoing fibres 222, albeit the signal power being reduced. Alternatively, the passive optical device 263 can be a wave division multiplexer (WDM) or alternatively a wave division demultiplexer (WDD). Other suitable passive optical devices 263 can be located in the casing. Each of the output fibres 222 can include a connector element 224, for example for connecting to the rear of a patch panel.

FIGS. 16a to 16n show a second embodiment of the invention 303 for a controlled flexibility cable. The second connector device 303 includes a casing 305 comprising first and second parts 305a,305b. The casing 305 is made from a plastics material such as Nylon and the first and second parts 305a,305b are arranged to fit together with a snap fit tongue 308 and groove 306 arrangement. The casing has a length of around 50 mm and an outside diameter of around 8 mm. The casing 305 is hollow and has a multi-fibre cable receiving end 311, which includes a substantially cylindrical bore having a series of annular ribs 314 spaced along the bore and that are arranged to impinge on the cable 1;101 when the first and second halves 305a,305b of the casing are connected together. The ribs 314 fix the relative positions of the cable 1;101 and the casing 305. The multi-fibre cable receiving part 311 of the casing 305 has an internal diameter of around 3.5 mm and extends axially through the bore around 20 mm.

A recess 315 is formed in the internal face of the curved wall of the casing and is arranged to receive a furcation support element 309. The furcation support element 309 is prismatic and has a substantially square cross section where each corner is radiused. The furcation support element 309 includes first and second end faces 341,343 and twelve through holes extending between the first and second end faces 341,343. Each through hole is arranged substantially parallel to the longitudinal axis of the furcation support element 309.

This type of connector 303 is used in applications where there is likely to be relatively small tensile loading on the cables.

A substantially octagonal bore extends from the furcation end through the casing until it meets a substantially cylindrical bore. The octagonal bore has a greater width than the diameter of the cylindrical bore. A trough is located within each half of the casing that extends longitudinally in a position proximal to the tongue and groove 308,306. When the second halves of the casing 305a,305b are fixed together, the troughs 316 form a tube having a substantially rectangular cross section. The troughs 316 are arranged to guide and support the fibres 13;113 towards the furcation support element 309.

The input fibres 13;113 are connected to the output fibres 222 by fusion splicing in a similar fashion to the first embodiment.

FIGS. 17a to 17f show two examples of a two stage furcation arrangement. FIG. 17a shows a first multi-fibre cable 1 having six subunits 9, entering into a first connector device 203. The individual fibres from each subunit 9 are connected to equivalent cables 9' by fusion splicing to the subunits 9 in a furcated manner as shown in an enlarged view in FIG. 17b, or each fibre is threaded into new sheaths by the traditional method. Each section of fibre optic cable 9' is routed appropriately and is connected to another connector device 203 at a second furcation stage E, as shown in FIG. 17c. The cable 9' is fusion spliced to output cables 220 each having a single fibre 222 and is fircated as shown in FIG. 17d, or each fibre is threaded into a new sheath by the traditional method. Each of the output cables 220 has a connector 224, for example for connecting to a network or telecommunications device such as the rear of a patch panel. FIGS. 17e and 17f show a similar arrangement. However, instead of using the connector device of the first embodiment 203 at the second furcation site E, the connector device of the second embodiment 303 is used.

It will be apparent to the skilled person that modifications can be made to the above embodiments that fall within the scope of the invention, for example alternative furcation support elements and cable connector elements can be used for transferring the load between the fibre optic cables and the connector device body. Alternatively sized and shaped connector device bodies can also be used.

The support column, furcation support element and/or cable connector element can be formed integrally with the casing.

The invention claimed is:

1. A connector device for connecting a first fibre optic cable to a plurality of second fibre optic cables, said connector device including:
    a casing comprising;
        a first opening arranged to receive the first fibre optic cable,
        a second opening arranged to receive the plurality of second fibre optic cables,
        a cavity that connects the first and second openings such that a fibre connection can be made between the first fibre optic cable and the plurality of second cables, and
        first and second parts that are connectable to each other; and
    a securing system for securing the casing to the first fibre optic cable and to the plurality of second fibre optic cables such that when secured thereto the casing transfers tensile loads between the cables, wherein the securing system includes:
        a first clamping member for clamping at least one strengthening member in the first fibre optic cable to the connector device,
        a furcation member including a plurality of bores which are arranged to receive and support the plurality of second fibre optic cables, and a protruding portion that is arranged such that strengthening members contained within the plurality of second fibre optic cables can be clamped thereto, wherein the protruding portion is axially aligned with the bores formed in the furcation member, and a second clamping member for clamping the strengthening members to the protruding portion.

2. A connector device according to claim 1, wherein the securing system includes a connector member comprising a tubular body that is arranged to receive the full cross-section of the first fibre optic cable, the arrangement being such that when the first fibre optic cable is inserted into the tubular body from a first end at least one of the strengthening members can protrude through a second end of the tubular body and be folded backwards over an external surface of the tubular body and clamped thereto with the first clamping member.

3. A connector device according to claim 2, wherein the tubular body includes a shoulder portion towards one end and a tail portion towards the other end.

4. A connector device according to claim 3, wherein the shoulder portion includes at least one recess formed therein for receiving at least one strengthening member contained within the first fibre optic cable.

5. A connector device according to claim 3, wherein the tail portion is tapered, or includes a tapered part, and the first clamping member is arranged to clamp the strengthening members to the tapered tail portion or tapered part of the tail portion.

6. A connector device according to claim 2, wherein the connector member is located towards the first opening of the casing and is a separate component from the casing.

7. A connector device according to claim 1, wherein the protruding portion includes at least one formation to improve the retaining function of the second clamping member.

8. A connector device according to claim 1, wherein the furcation member is located within the casing towards the second opening and is a separate component from the casing.

9. A connector device according to claim 1, wherein the casing includes a formation that is arranged to receive and interact with at least a part of the furcation member to fix its axial position relative to the casing.

10. A connector device according to claim 8, wherein the casing includes a formation that is arranged to receive and interact with at least a portion of the furcation member to fix its rotational orientation with respect to the casing.

11. A connector device according to claim 1, wherein the casing is elongate and is arranged such that the first and second parts are separable from each other along the length of the casing.

12. A connector device according to claim 1, wherein the first and second parts of the casing are releasably connectable to each other.

13. A connector device according to claim 1, wherein the casing is made from a plastics material and the first and second parts of the casing are arranged to snap-fit together.

14. A connector device according to claim 1, wherein the securing system including means for clamping, or otherwise attaching, a wire-like fibre optic cable strengthening member to the connector device.

15. A connector device according to claim 14, wherein the clamping means includes a receiving member arranged to receive the wire-like strengthening member from an axial direction and a third clamping member that is arranged to clamp the strengthening member to the receiving member in a direction that is substantially orthogonal to the axial direction.

16. A connector device according to claim 14, wherein a third clamping member is used to connect the first and second parts of the casing together.

17. A connector device according to claim 14, wherein the securing system includes cement for bonding the wire-like strengthening member to a receiving element.

18. A connector device according to claim 1, including a passive optical device located within the casing that is connectable with the first fibre optic cable and the plurality of second fibre optic cables.

19. A connector device according to claim 18, wherein the passive optical device includes any of the following: a splitter, a wave division multiplexer (WDM) and a wave division demultiplexer (WDD).

20. A connector device according to claim 1, wherein the casing is constructed and arranged to clamp directly onto the first fibre optic cable and firmly grip the cable when the first and second parts are secured together.

21. A connector device according to claim 1, wherein the casing includes at least one formation for attaching the casing to a support member.

22. A fibre optic cable assembly including a first fibre optic cable comprising at least one strengthening member, a plurality of second fibre optic cables wherein at least some of the second fibre optic cables include fibrous strengthening members, and a connector device according to claim 1, wherein fibres in the first fibre optic cable are connected to respective fibres in the plurality of second fibre optic cables either directly or via an intermediate component.

23. A fibre optic cable assembly according to claim 22, wherein the first fibre optic cable is a multi-fibre optical cable that is furcated within the casing and at least some of the fibres in the first fibre optic cable are connected to respective fibres in the plurality of second fibre optic cables by fusing.

24. A fibre optic cable assembly according to claim 22, wherein the first fibre optic cable is a single fibre cable that is connected to a passive optical device, and the passive optical device is connected to the plurality of second fibre optic cables.

25. A fibre optic cable assembly according to claim 22, wherein the at least one strengthening member of the first fibre optic cable includes at least one of: fibrous strengthening members and a wire-like strengthening member.

26. A method for producing a furcated fibre optic cable assembly, said method including providing a first fibre optic cable comprising a multi-fibre optical cable, exposing a section of the fibres contained therein, providing a plurality of second fibre optic cables and exposing a section of the fibres contained therein, connecting at least some of the fibres in the multi-fibre optical cable to respective fibres of the second fibre optic cables by fusion splicing, and applying a connector device to house the exposed fibres and to increase the tensile strength between the first and second cables, said connector device comprising:

a casing comprising a first opening arranged to receive the first fibre optic cable, a second opening arranged to receive the plurality of second fibre optic cables, a cavity that connects the first and second openings such that a fibre connection can be made between the first fibre optic cable and the plurality of second cables, and first and second parts that are connectable to each other; and a securing system for securing the casing to the first fibre optic cable and to the plurality of second fibre optic cables such that when secured thereto the casing transfers tensile loads between the cables, wherein the securing system includes a first clamping member for clamping at least one strengthening member in the first fibre optic cable to the connector device, a furcation member that is arranged to receive and support the plurality of second fibre optic cables, said furcation member including a protruding portion that is arranged such that strengthening members contained within the plurality of second fibre optic cables can be clamped thereto and a second clamping member for clamping the strengthening members to the protruding portion.

27. A connector device according to claim 1, wherein the furcation member includes first and second end faces, and the protruding portion extends from a central portion of one of the first and second end faces.

28. A connector device according to claim 7, wherein the at least one formation includes at least one rib or recess.

29. A connector device for connecting a first fibre optic cable to a plurality of second fibre optic cables, said connector device including:
- a casing comprising:
  - a first opening arranged to receive the first fibre optic cable,
  - a second opening arranged to receive the plurality of second fibre optic cables,
  - a cavity that connects the first and second openings such that a fibre connection can be made between the first fibre optic cable and the plurality of second cables, and
  - first and second parts that are connectable to each other; and
- a securing system for securing the casing to the first fibre optic cable and to the plurality of second fibre optic cables such that when secured thereto the casing transfers tensile loads between the cables, wherein the securing system includes:
  - a first clamping member for clamping at least one strengthening member in the first fibre optic cable to the connector device,
  - a furcation member that is arranged to receive and support the plurality of second fibre optic cables, said furcation member including a protruding portion that is arranged such that strengthening members contained within the plurality of second fibre optic cables can be clamped thereto,
  - a second clamping member for clamping the strengthening members to the protruding portion, and
  - a connector member comprising a tubular body that is arranged to receive the full cross-section of the first fibre optic cable, the arrangement being such that when the first fibre optic cable is inserted into the tubular body from a first end at least one of the strengthening members can protrude through a second end of the tubular body and be folded backwards over an external surface of the tubular body and clamped thereto with the first clamping member, wherein the tubular body includes a shoulder portion towards one end and a tail portion towards the other end, and the shoulder portion includes at least one recess formed therein for receiving at least one strengthening member contained within the first fibre optic cable.

30. A connector device according to claim 29, wherein the tail portion is tapered, or includes a tapered part, and the first clamping member is arranged to clamp the strengthening members to the taper.

31. A connector device according to claim 29, including a first fibre optic cable comprising at least one strengthening member clamped to the tubular body by the first clamping member, a plurality of second fibre optic cables wherein at least some of the second fibre optic cables include fibrous strengthening members clamped to the protruding portion by the second clamping member, wherein fibres in the first fibre optic cable are connected to respective fibres in the plurality of second fibre optic cables either directly or via a passive optical device.

32. A connector device for connecting a first fibre optic cable to a plurality of second fibre optic cables, said connector device including:
- a casing comprising:
  - a first opening arranged to receive the first fibre optic cable,
  - a second opening arranged to receive the plurality of second fibre optic cables,
  - a cavity that connects the first and second openings such that a fibre connection can be made between the first fibre optic cable and the plurality of second cables, and
  - first and second parts that are connectable to each other;
- a passive optical device located within the casing that is connectable to the first fibre optic cable and the plurality of second fibre optic cables; and
- a securing system for securing the casing to the first fibre optic cable and to the plurality of second fibre optic cables such that when secured thereto the casing transfers tensile loads between the cables, wherein the securing system includes:
  - a first clamping member for clamping at least one strengthening member in the first fibre optic cable to the connector device,
  - a furcation member that is arranged to receive and support the plurality of second fibre optic cables, said furcation member including a protruding portion that is arranged such that strengthening members contained within the plurality of second fibre optic cables can be clamped thereto, and
  - a second clamping member for clamping the strengthening members to the protruding portion.

33. A connector device according to claim 32, wherein the passive optical device includes any of the following: a splitter, a wave division multiplexer (WDM) and a wave division demultiplexer (WDD).

34. A connector device according to claim 32, including a first fibre optic cable comprising at least one strengthening member clamped to the tubular body by the first clamping member, a plurality of second fibre optic cables wherein at least some of the second fibre optic cables include fibrous strengthening members clamped to the protruding portion by the second clamping member, wherein fibres in the first fibre optic cable are connected to respective fibres in the plurality of second fibre optic cables via the passive optical device.

* * * * *